United States Patent
Banner et al.

(10) Patent No.: US 8,280,180 B2
(45) Date of Patent: Oct. 2, 2012

(54) METHOD AND SYSTEM FOR IMAGE RESTORATION IN THE SPATIAL DOMAIN

(75) Inventors: Ron Banner, Haifa (IL); Michal Aharon, Haifa (IL); Carl Staelin, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 377 days.

(21) Appl. No.: 12/745,799

(22) PCT Filed: Dec. 4, 2007

(86) PCT No.: PCT/US2007/024916
§ 371 (c)(1),
(2), (4) Date: Jun. 2, 2010

(87) PCT Pub. No.: WO2009/073006
PCT Pub. Date: Jun. 11, 2009

(65) Prior Publication Data
US 2010/0246952 A1    Sep. 30, 2010

(51) Int. Cl.
*G06K 9/00* (2006.01)
*G06K 9/46* (2006.01)
*G06K 9/66* (2006.01)
*G06K 9/40* (2006.01)
*H04N 5/228* (2006.01)
*H04N 1/46* (2006.01)
*H04N 7/12* (2006.01)
*H04N 11/02* (2006.01)
*H04N 11/04* (2006.01)
*H04B 1/66* (2006.01)

(52) U.S. Cl. ........ 382/255; 382/100; 382/162; 382/195; 382/254; 348/208.4; 348/222.1; 358/530; 375/240.26

(58) Field of Classification Search .................. 382/100, 382/162, 167, 181, 195, 255–275; 348/207.1, 348/208.99, 208.4, 208.13, 222.1; 358/530; 375/240.26
See application file for complete search history.

(56) References Cited

U.S. PATENT DOCUMENTS

2003/0021489 A1    1/2003  Miura et al.
2003/0053712 A1*   3/2003  Jansson ................ 382/275
(Continued)

FOREIGN PATENT DOCUMENTS
JP    2004-173060    6/2004

OTHER PUBLICATIONS

Reeves, S.J.; , "Fast image restoration without boundary artifacts," Image Processing, IEEE Transactions on , vol. 14, No. 10, pp. 1448-1453, Oct. 2005.*

(Continued)

*Primary Examiner* — Anand Bhatnagar
*Assistant Examiner* — Nathan Bloom

(57) ABSTRACT

Method and system embodiments of the present invention are directed to restoration of corrupted images using spatial-domain image-processing methods that can effectively employ spatial-domain information both in order to avoid various types of artifacts and distortions produced by frequency-domain image-processing operations and to achieve computational efficiency. The various method and system embodiments of the present invention employ a family of penalty functions to constrain iterative restoration images corrupted by both deterministic corruptions, such as motion-induced blur and blurring due to optical misalignment, incorrect positioning of optical components, and defective optical components as well as essentially non-deterministic noise corruption introduced at various stages of image acquisition, image encoding, image storage, and image transmission.

20 Claims, 21 Drawing Sheets

U.S. PATENT DOCUMENTS

| | | | |
|---|---|---|---|
| 2004/0061795 A1* | 4/2004 | Kondo et al. | 348/239 |
| 2005/0031218 A1* | 2/2005 | Berkner et al. | 382/240 |
| 2005/0147313 A1* | 7/2005 | Gorinevsky | 382/255 |
| 2007/0058726 A1* | 3/2007 | Ha et al. | 375/240.24 |
| 2008/0013850 A1* | 1/2008 | Sakurai et al. | 382/255 |
| 2008/0240607 A1* | 10/2008 | Sun et al. | 382/275 |
| 2009/0080798 A1* | 3/2009 | Maurer et al. | 382/275 |
| 2011/0286682 A1* | 11/2011 | Banner et al. | 382/274 |

OTHER PUBLICATIONS

Sungjun Yim; Jeongho Shin; Joonki Paik; , "Block-based fast image restoration," Wavelet Analysis and Pattern Recognition, 2007. ICWAPR '07. International Conference on , vol. 1, no., pp. 403-408, Nov. 2-4, 2007.*

Aghdasi, F.; Ward, R.K.; , "Reduction of boundary artifacts in image restoration," Image Processing, IEEE Transactions on , vol. 5, No. 4, pp. 611-618, Apr. 1996.*

R.C. Puetter,T.R. Gosnell,Amos Yahil , "Digital Image Reconstruction: Deblurring and Denoising", Annual Review of Astronomy and Astrophysics, vol. 43: pp. 139-194 Sep. 2005.*

Marco Donatelli and Stefano Serra-Capizzano, "Antireflective Boundary Conditions for Deblurring Problems," Journal of Electrical and Computer Engineering, vol. 2010, Article ID 241467, 18 pages, 2010.*

A. Aricò, M. Donatelli, and S. Serra-Capizzano, "The anti-reflective algebra: structural and computational analysis with application to image deblurring and denoising," Calcolo, vol. 45, No. 3, pp. 149-175, 2008.*

M. Christiansen and M. Hanke, "Deblurring methods using antireflective boundary conditions," SIAM Journal on Scientific Computing, vol. 30, No. 2, pp. 855-872, 2007.*

* cited by examiner

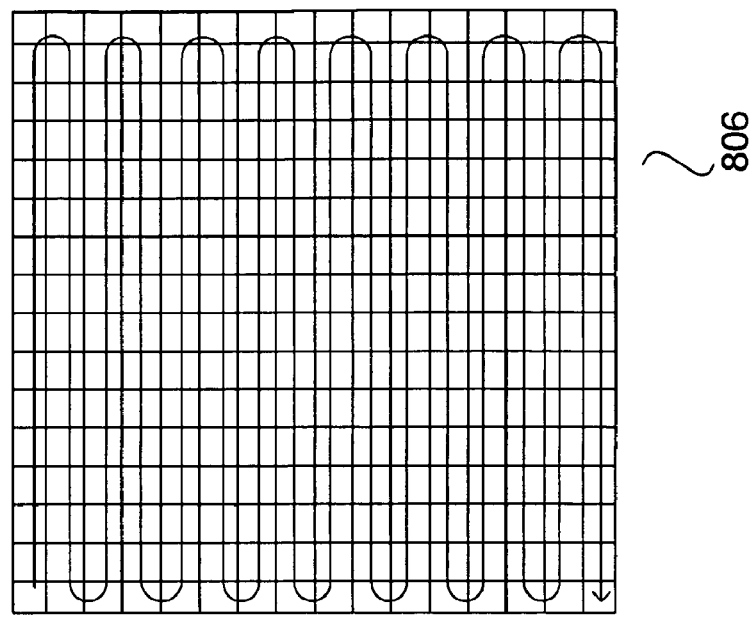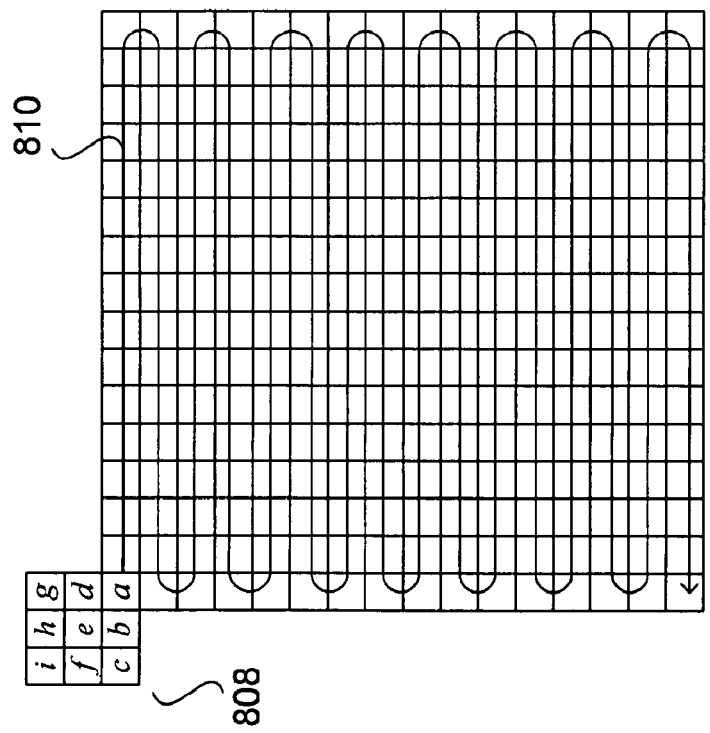
Figure 8B

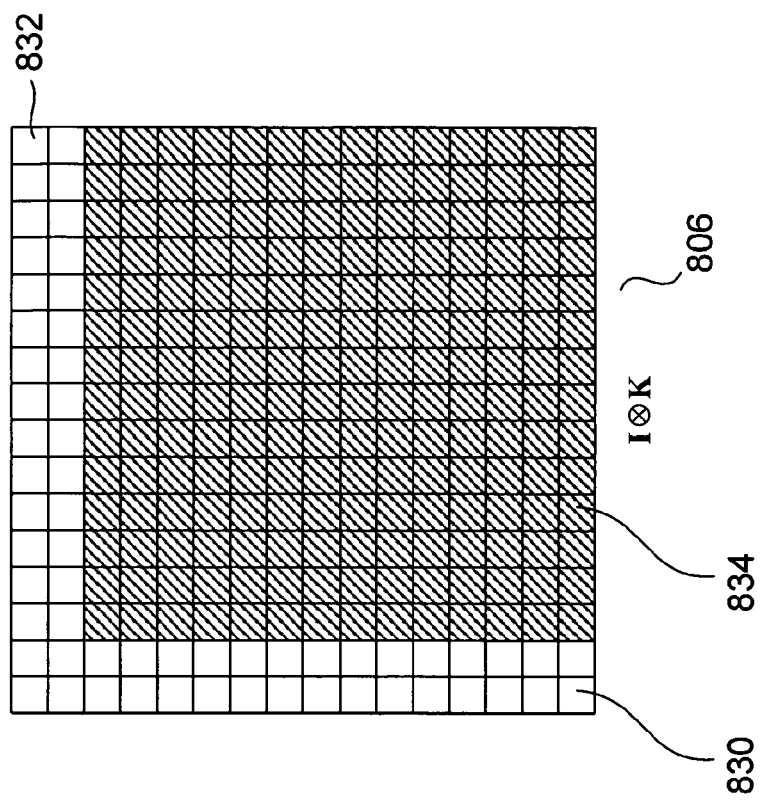
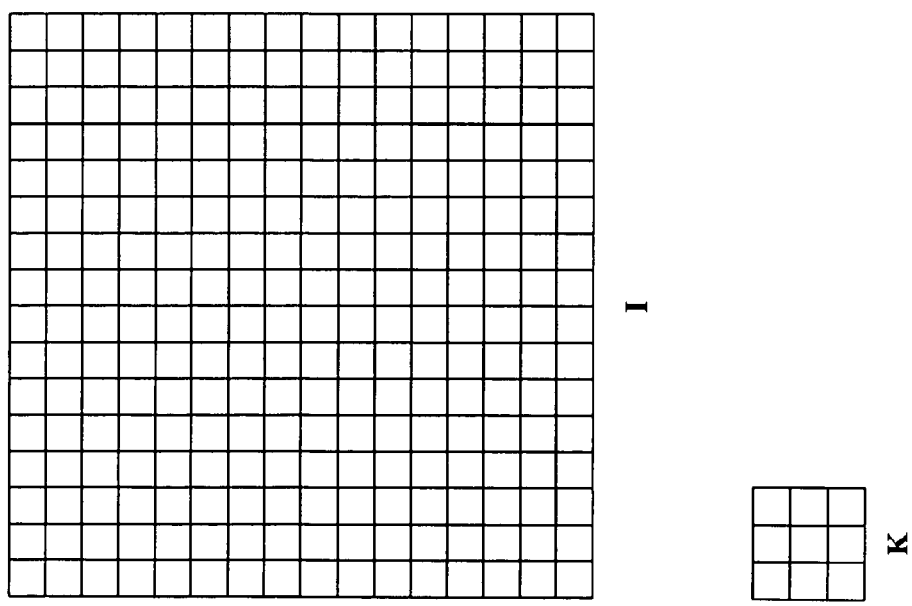
Figure 8D

Figure 9

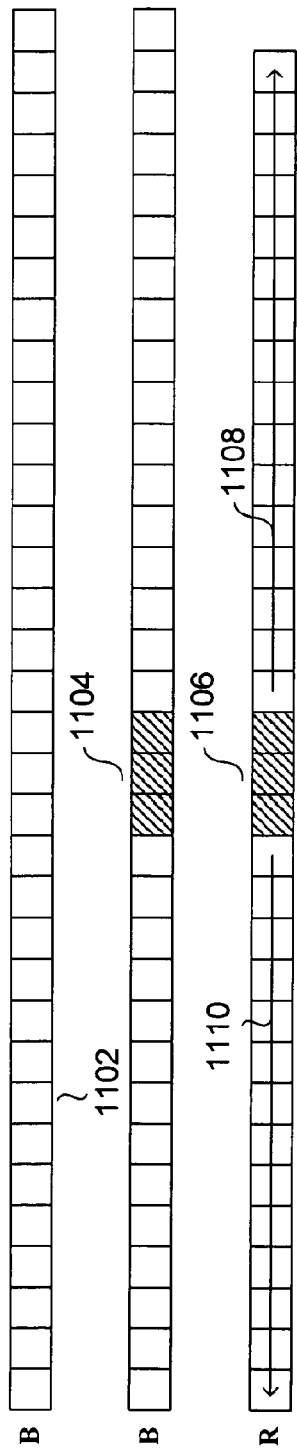
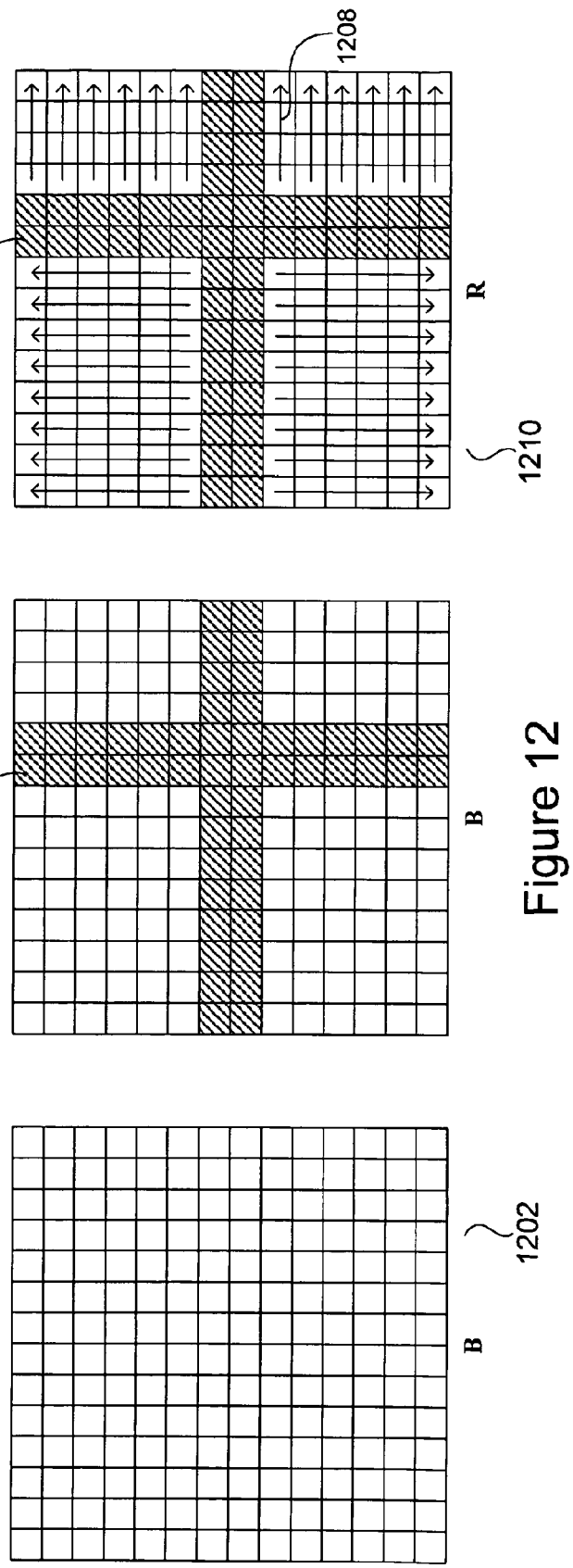
Figure 11
Figure 12

$$\underbrace{\begin{bmatrix} b_2 \\ b_3 \\ b_4 \\ b_5 \\ b_6 \\ b_7 \\ b_8 \\ b_9 \end{bmatrix}}_{\mathbf{B_c}} = \underbrace{\begin{bmatrix} 1/3 & 1/3 & 1/3 & 0 & 0 & 0 & 0 & 0 & 0 & 0 \\ 0 & 1/3 & 1/3 & 1/3 & 0 & 0 & 0 & 0 & 0 & 0 \\ 0 & 0 & 1/3 & 1/3 & 1/3 & 1/3 & 0 & 0 & 0 & 0 \\ 0 & 0 & 0 & 1/3 & 1/3 & 1/3 & 1/3 & 0 & 0 & 0 \\ 0 & 0 & 0 & 0 & 1/3 & 1/3 & 1/3 & 0 & 0 & 0 \\ 0 & 0 & 0 & 0 & 0 & 1/3 & 1/3 & 1/3 & 0 & 0 \\ 0 & 0 & 0 & 0 & 0 & 0 & 1/3 & 1/3 & 1/3 & 0 \\ 0 & 0 & 0 & 0 & 0 & 0 & 0 & 1/3 & 1/3 & 1/3 \end{bmatrix}}_{\mathbf{H}} \cdot \underbrace{\begin{bmatrix} i_0 \\ i_1 \\ i_2 \\ i_3 \\ i_4 \\ i_5 \\ i_6 \\ i_7 \\ i_8 \\ i_9 \end{bmatrix}}_{\mathbf{I}}$$

$$\underbrace{\begin{bmatrix} b_2 \\ b_3 \\ b_4 \\ b_5 \\ b_6 \\ b_7 \end{bmatrix}}_{1412} = \underbrace{\begin{bmatrix} 1/3 & 1/3 & 1/3 & & & & & \\ & 1/3 & 1/3 & 1/3 & & & & \\ & & 1/3 & 1/3 & 1/3 & & & \\ & & & 1/3 & 1/3 & 1/3 & & \\ & & & & 1/3 & 1/3 & 1/3 & \\ & & & & & 1/3 & 1/3 & 1/3 \end{bmatrix}}_{1410} \cdot \underbrace{\begin{bmatrix} i_0 \\ i_1 \\ i_2 \\ i_3 \\ i_4 \\ i_5 \\ i_6 \\ i_7 \end{bmatrix}}_{1408}$$

Figure 14B

$$\begin{bmatrix} b_2 \\ b_3 \\ b_4 \\ b_5 \\ b_6 \\ b_7 \\ b_2 \\ b_7 \end{bmatrix} = \begin{bmatrix} \frac{1}{3} & \frac{1}{3} & \frac{1}{3} & 0 & 0 & 0 & 0 & 0 \\ 0 & \frac{1}{3} & \frac{1}{3} & \frac{1}{3} & 0 & 0 & 0 & 0 \\ 0 & 0 & \frac{1}{3} & \frac{1}{3} & \frac{1}{3} & 0 & 0 & 0 \\ 0 & 0 & 0 & \frac{1}{3} & \frac{1}{3} & \frac{1}{3} & 0 & 0 \\ 0 & 0 & 0 & 0 & \frac{1}{3} & \frac{1}{3} & \frac{1}{3} & 0 \\ 0 & 0 & 0 & 0 & 0 & \frac{1}{3} & \frac{1}{3} & \frac{1}{3} \\ 0 & 0 & 1 & 0 & 0 & 0 & 0 & 0 \\ 0 & 0 & 0 & 0 & 0 & 0 & 0 & 1 \end{bmatrix} \cdot \begin{bmatrix} i_0 \\ i_1 \\ i_2 \\ i_3 \\ i_4 \\ i_5 \\ i_6 \\ i_7 \end{bmatrix}$$

$\hat{\mathbf{B}}$   1414   1416   $\hat{\mathbf{H}}$   1418   $\mathbf{I}$

Figure 14C $$\begin{bmatrix} r_0 \\ r_1 \\ r_2 \\ r_3 \\ r_4 \\ r_5 \\ r_6 \\ r_7 \end{bmatrix} = \begin{bmatrix} 3 & -3 & 3 & 0 & -3 & 3 & -1 & -1 \\ 0 & 3 & -3 & 0 & 3 & -3 & 0 & 1 \\ 0 & 0 & 0 & 0 & 0 & 0 & 1 & 0 \\ 0 & 0 & 3 & 0 & -3 & 3 & -1 & -1 \\ 0 & 0 & 0 & 0 & 3 & -3 & 0 & 1 \\ 0 & 0 & -3 & 3 & 0 & 0 & 1 & 0 \\ 0 & 0 & 3 & -3 & 0 & 3 & -1 & -1 \\ 0 & 0 & 0 & 0 & 0 & 0 & 0 & 1 \end{bmatrix} \cdot \begin{bmatrix} b_2 \\ b_3 \\ b_4 \\ b_5 \\ b_6 \\ b_7 \\ b_2 \\ b_7 \end{bmatrix}$$

$\mathbf{R}$   $\hat{\mathbf{H}}^{-1}$   1420   $\hat{\mathbf{B}}$

Figure 14D

Algorithm B

Input:  Blurred image $B=[B_1, B_2, \ldots, B_N]$,
Blur kernel $W=[W_1, W_2, \ldots, W_M]$.
Output:  Restored image $R$ 1. Construct a map $M$ of all pixels that lie in the middle of a flat region i.e., each pixel in the map $M$ is equal to the variance of that pixel and its neighbors in the blurred image $B$.
2. Construct the matrix $H$ as follows:
   A. Define the deblurring equations in $H$ as follows:
      I. Define the first row of the matrix $H$ to be: $W_1, W_2, \ldots, W_M, \underbrace{0, 0 \ldots 0}_{N-M}$.

II. Define rows number 2 till $N-M+1$ in $H$ to be a cyclically shifted version of the first row i.e., $R_2 = 0, W_1, W_2, \ldots, W_M, \underbrace{0, 0 \ldots, 0}_{N-M-1}$ $R_3 = 0, 0, W_1, W_2, \ldots, W_M, \underbrace{0, 0 \ldots, 0}_{N-M-2}$ $\vdots$ $R_{N-M+1} = \underbrace{0, 0, \ldots, 0}_{N-M-1}, W_1, W_2, \ldots, W_M$ B. While $H$ is not square define assignment equations for $H$ as follows:
      I. Let $i$ be the index of a pixel that has the smallest value in the map $M$ among all pixels that have not been considered for assignment before.
      II. Add a row $r$ to $H$ that has zeros in all indices except for the index $i$ for which it has a value of 1.
      III. If $\det(A) = 0$ then remove row $r$ from the matrix $H$.

3. $R \leftarrow H^{-1} \cdot B$
4. Return the restored image $R$

Figure 15

METHOD AND SYSTEM FOR IMAGE RESTORATION IN THE SPATIAL DOMAIN

TECHNICAL FIELD

The present invention is related to image processing and, in particular, to methods and systems for restoring images, corrupted both by non-deterministic noise and by deterministic degradation, by iterative restoration involving repeated optimizations, in the spatial domain, constrained by a penalty function designed to direct the iterative restoration to produce restored images that are both deblurred and denoised.

BACKGROUND OF THE INVENTION

During the past 50 years, a large amount of theoretical and practical research has been devoted to image-processing techniques for enhancing, restoring, and extracting information from images. Many image-enhancement and image-restoration methods are carried out in the frequency domain, following a Fourier transform of an image from the spatial domain to the frequency domain. However, in many cases, frequency-domain-based image-enhancement and image-restoration operations produce periodic artifacts and distortions in a resulting restored image obtained by an inverse Fourier transform of an image processed in the frequency-domain back to the spatial domain. There are various types of information in the spatial domain that can be used to direct or constrain various image-enhancement and image-restoration operations in order to prevent introduction of periodic artifacts and distortions, but that information is generally either unavailable or difficult to apply in the frequency domain. For these reasons, theoreticians and researchers who work on image-processing-related problems, developers and vendors of image-processing systems, users of devices and systems that incorporate image-processing components, and consumers of processed images have all recognized the need for improved image-processing methods and systems that can effectively apply spatial-domain information to direct and constrain image-processing operations in order to produce high-quality restored images in as most efficient and cost-effective manner as possible.

SUMMARY OF THE INVENTION

Method and system embodiments of the present invention are directed to restoration of corrupted images using spatial-domain image-processing methods that can effectively employ spatial-domain information both in order to avoid various types of artifacts and distortions produced by frequency-domain image-processing operations and to achieve computational efficiency. The various method and system embodiments of the present invention employ a family of penalty functions to constrain iterative restoration images corrupted by both deterministic corruptions, such as motion-induced blur and blurring due to optical misalignment, incorrect positioning of optical components, and defective optical components as well as essentially non-deterministic noise corruption introduced at various stages of image acquisition, image encoding, image storage, and image transmission.

BRIEF DESCRIPTION OF THE DRAWINGS

FIG. 6A shows an exemplary circulant blur kernel.

FIG. 6B shows a non-circulant blur kernel.

FIGS. 8A-D illustrate convolution of a two-dimensional ideal image I with a two-dimensional blur kernel K.

FIG. 9 provides greater detail with regard to the linear convolution described with reference to FIG. 7.

FIG. 11 illustrates application of a spatial-domain image-restoration technique to a one-dimensional blurred image.

FIG. 12 illustrates the spatial-domain image-restoration technique, discussed with reference to FIG. 11, applied to a two-dimensional blurred image.

FIGS. 14A-D illustrates a matrix-algebra expression equivalent to the above-discussed 3-element blur-kernel convolution process by which deterministic blurring of an ideal one-dimensional image can be modeled and a physical, blurred image restored.

FIG. 15 provides an algorithm for spatial-domain restoration of one-dimensional images, as discussed with reference to FIGS. 14A-D.

DETAILED DESCRIPTION OF THE INVENTION

Figure 1:
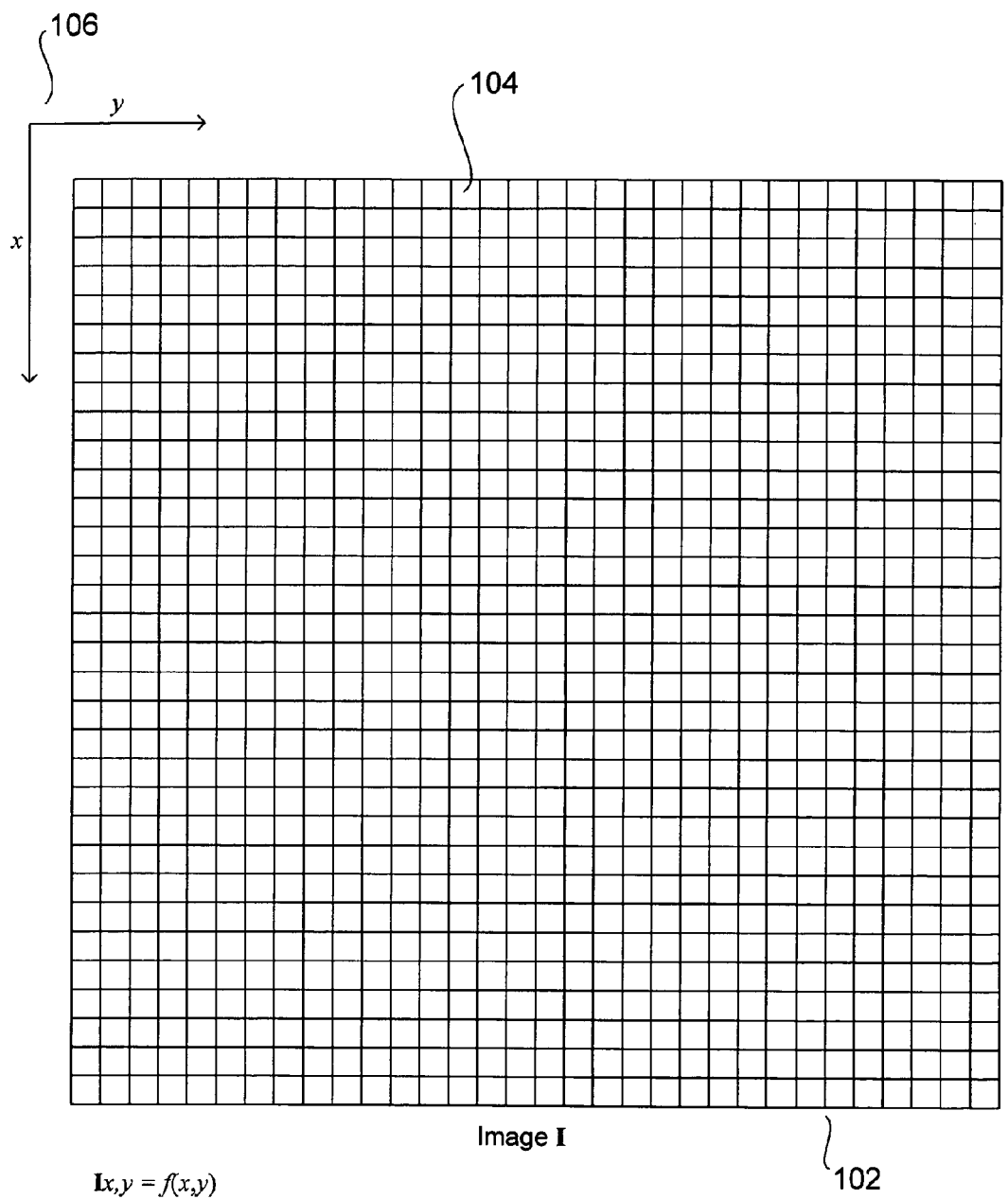
FIG. 1 shows a representation of a typical digitally encoded image.

The present invention is directed to restoration of corrupted images. In particular, method and system embodiments of the present invention are directed to restoring images corrupted both by deterministic corruptions, such as motion-induced blur and focus blur produced as a result of misalignment or improper positioning of optical components, as well as essentially non-deterministic corruption generally referred to as "noise." Noise may be introduced in any of numerous steps, including during image acquisition by optical, electronic, chemical, and/or mechanical components, during digital encoding of images, during storage of digitally-encoded images in, and retrieval of stored images from, electronic memories and mass-storage devices, during transmission of digitally-encoded images from one device or system to another, and during computational processing of images by image-processing systems.

In the following discussion, an overview of electronically encoded images and of various image-processing techniques and considerations are first provided. Next, problems associated with frequency-domain image-processing techniques are discussed. Spatial-domain image-restoration techniques are then discussed, in preparation for disclosure of various method embodiments of the present invention that rely on particular penalty-function constraints to iteratively restore corrupted images.

Method embodiments of the present invention are intended to be carried out by electronic processing systems, including computer systems and various electronic devices that incorporate microprocessors and stored routines to carry out image-restoration operations. Method embodiments of the present invention are discussed, below, with reference to various mathematical expressions and a flow diagram that includes various mathematical expressions. As well understood by those familiar with computer science, electronics, and image processing, computational processes that carry out useful procedures, such as restoration of images, may be described in various different, equivalent ways, including mathematical formulas, computer code, flow diagrams, and textural descriptions. The method and system embodiments of the present invention carry out useful processes that produce and create tangible results, as can be well appreciated by anyone who has obtained a deblurred and denoised image from an initial blurred and noisy image by image-restoration processes. Image-restoration processes may be employed in a variety of different devices, including digital cameras and cell phones, as well as in computer systems and image-processing systems that produce restored images from corrupted images. Image restoration may be employed to restore images from reconnaissance aircraft and space probes corrupted by optical, electronic, and transmission errors, images input by electronic scanning devices into computer systems, and even digitally encoded representations of analog and other physical images corrupted by chemical, biochemical, and environmental processes.

FIG. 1 shows a representation of a typical digitally encoded image. The image comprises a two-dimensional array 102, or matrix, of elements. For example, in FIG. 1, each small cell, such as cell 104, of the two-dimensional array 102 represents a different element of the image. In monochrome images, each element may correspond to an integral value within a range of integral values that represent the intensity of light measured at a spatial position corresponding to the element during an image acquisition. In black-and-white photography, for example, each element of a digitally encoded image corresponds to a pixel, the smallest portion of an image that can be printed, displayed, or otherwise rendered to a viewer. Pixels often have intensities that are expressed as integer values that range from 0, representing black, to 255, representing white, although other numerical ranges and encodings may be used. Color-image encodings are somewhat more complex, and various different methods for encoding color images are used. These methods generally encode colors as three different integral values associated with each element of the image. Representation systems include the RBG system used for images displayed by computer systems, the HSI system, the CMY system, the YIQ system, and other such color-image-encoding systems. The method and system embodiments of the present invention may be practiced on both black-and-white images, in which case each element corresponds to a single intensity value, as well as on color images, in which case each element may be associated with a number of different numerical values. In the latter case, method and system embodiments of the present invention may be carried out on only one of the various values associated with each element, such as the intensity values in the HSI encoding system, can be carried out separately on multiple, or all, intensity values associated with each element, or may be carried out on a composite value derived from two or more values associated with each element of the image. In the following discussion, images are assumed to be composed of elements, each element associated with a single value, as in black-and-white images.

In FIG. 1, the image 102 is labeled with a pair of orthogonal axes 106 that allow each element of the image to be specified by a pair of coordinates (x,y). Thus, an image may be considered to be a function $f(x,y)$ which associates an intensity value with each element, or pixel, of the planar domain of the image. Alternatively, an image may be considered to be an array, each element of the array indexed by two values x and y. In certain cases, an image may additionally be considered to be a one-dimensional array of pixels, or a function $f(x)$ which associates an intensity value with each element, or pixel, of the linear domain of the image, just as a two-dimensional array declared in a computer program can be mapped to a one-dimensional sequence of successive memory words.

Figure 2:
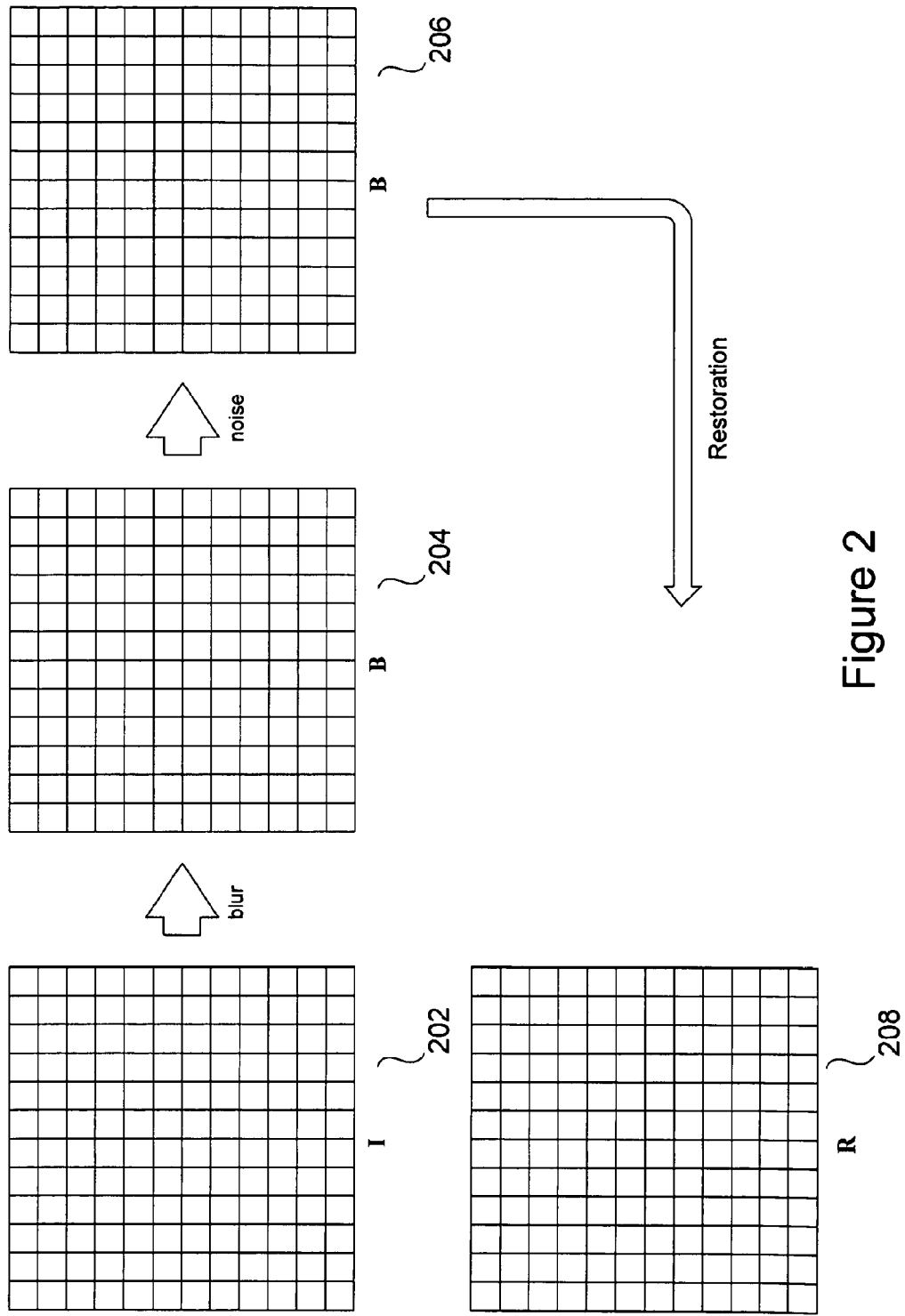
FIG. 2 illustrates image corruption and image restoration.

FIG. 2 illustrates image corruption and image restoration. An ideal image I 202 may represent an image that would be obtained by a perfectly designed and functioning, noise-free image acquisition and encoding system. An ideal image, for example, may be what a user visually perceives from a real-world scene and attempts to encode using a digital camera. Unfortunately, image-acquisition devices and systems are generally not perfectly designed and perfectly operated, but instead suffer a variety of deterministic image-corrupting problems, including improper focus, motion of the image-acquisition devices system with respect to the scene being recorded, misalignment of optical components, and other such image-corrupting phenomena. Therefore, the image acquired using the image-acquisition device is generally a corrupted image B 204 corresponding to the ideal image, referred to in the following discussion as a blurred image. In addition to essentially deterministic corruption that can often be accurately mathematically and computationally modeled, the image-acquisition device may also include essentially non-deterministic noise, so that the acquired image B is both blurred and noisy 206. Noise is frequently introduced by light-detection components of cameras and sensors, and may also be introduced during storage and retrieval of digitally encoded images to and from mass-storage devices and electronic memories and during transmission of digitally encoded images over communications media. The intent of image-restoration methods is, as shown in FIG. 2, transformation of a blurred and noisy image 206 to a restored image R 208, where the restored image 208 is desired to be as close as possible to the corresponding ideal image I. Method and system embodiments of the present invention are directed to the image-restoration process.

Next, several different operations and transformations useful in image processing are described. The first operation is a mathematical operation referred to as "convolution." The convolution of two one-dimensional functions $f(x)$ and $g(x)$ can be expressed as:

$$f(x) * g(x) = \int_{-\infty}^{\infty} f(\alpha) g(x-\alpha) d\alpha$$

Figure 3A:
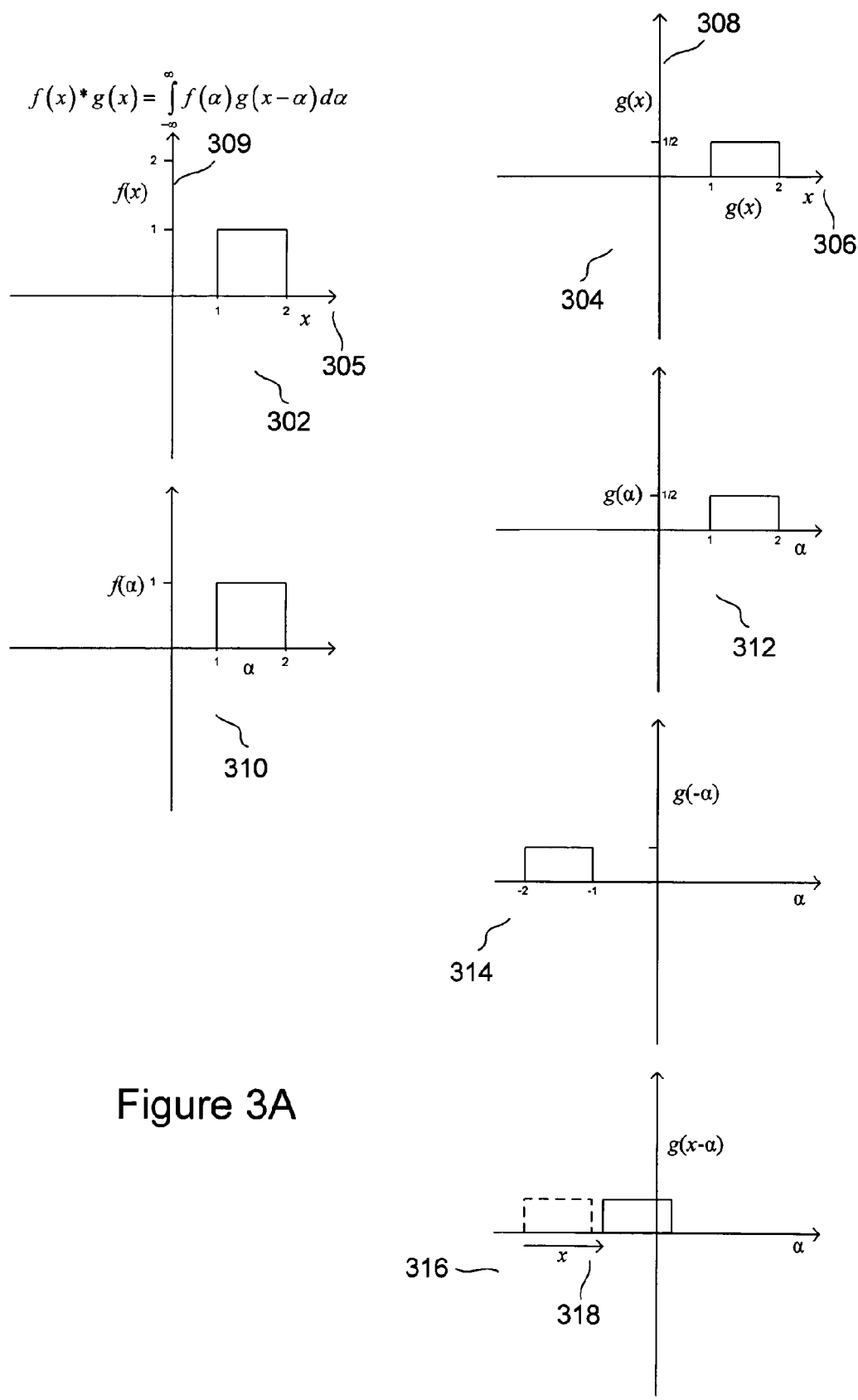
FIGS. 3A-B illustrate the convolution of two simple one-dimensional functions $f(x)$ and $g(x)$.
Figure 3B:
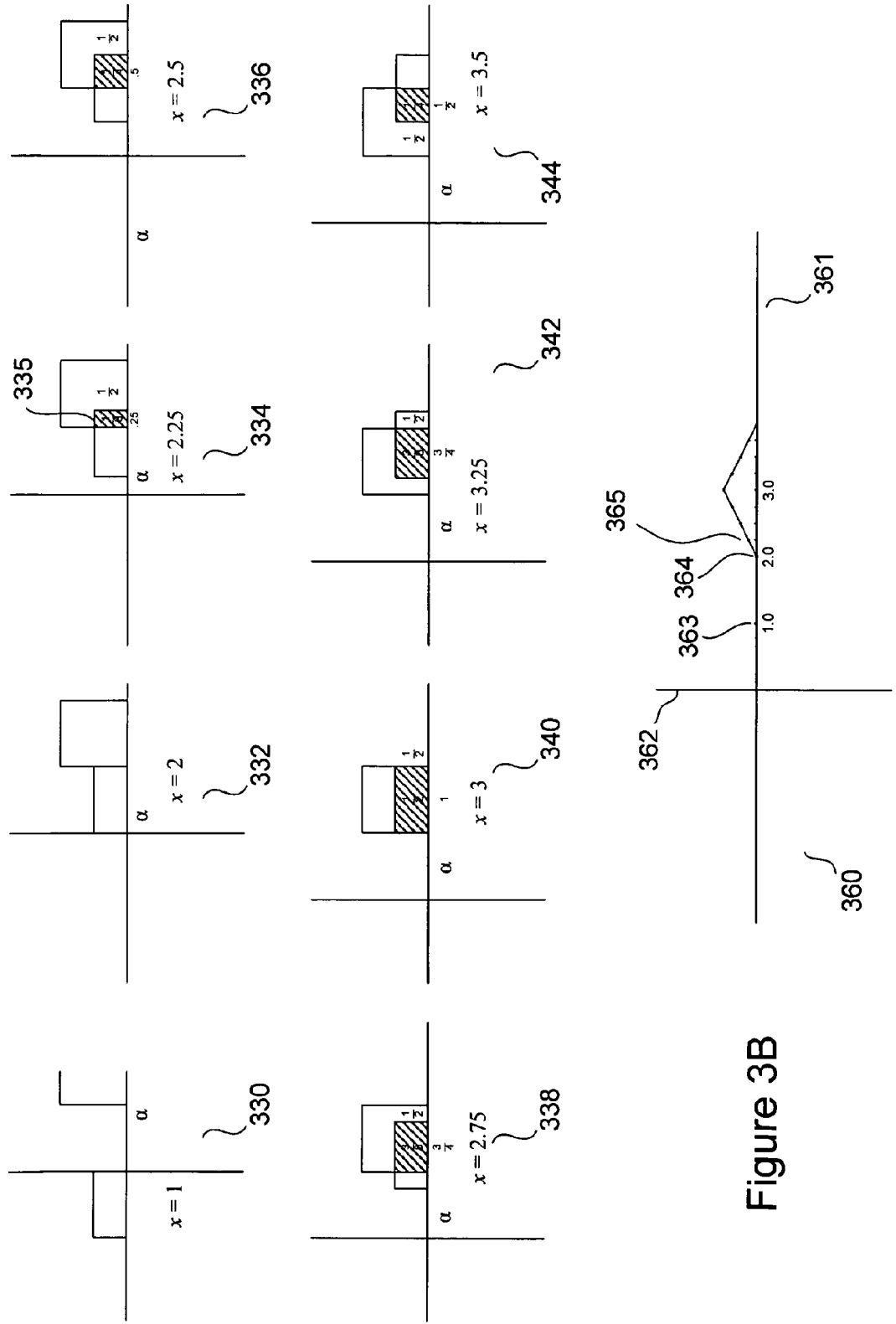

FIGS. 3A-B illustrate the convolution of two simple one-dimensional functions $f(x)$ and $g(x)$. At the top of FIG. 3A, the function $f(x)$ is graphed in a first graph 302 and the function $g(x)$ is graphed in a second graph 304. In both cases, the horizontal axes 305 represent values of the independent variable x, and the vertical axes 307 and 308 represent values of the functions $f(x)$ and $g(x)$, respectively. The independent variable can be renamed $\alpha$ and the functions $f(\alpha)$ and $g(\alpha)$ graphed as shown in graphs 310 and 312 in FIG. 3A. The functions ƒ(α) and g(α) have the same form as the functions ƒ(x) and g(x). The function g(x−α) can be obtained from the function g(α) as shown in graphs 314 and 316 in FIG. 3A. First, the function g(α) is mirrored through the vertical axis to produce the function g(−α), shown in graph 314 of FIG. 3A. The function g(α) is then shifted rightward by a distance x 318 to produce the function g(x−α).

Referring back to the mathematical expression for the convolution operation, it can be seen that the value for the convolution of the functions ƒ and g at the domain value x is the product of the functions ƒ(α) and g(x−α) integrated over all possible values of α. FIG. 3B provides a series of graphs to illustrate successive computation of the dependent values of the convolution of ƒ and g, f*g, at each of a series of different values of x. Graph 330 illustrates a superposition of the functions ƒ(β) and g(x−α) when x=1. Positive portions of the two functions do not overlap. Wherever ƒ(α) is a positive value, g(x−α) has the value 0, and vice-versa. Therefore, the product of the two functions integrated for all values of α is 0. The convolution ƒ(x)*g(x) is plotted in graph 360 in FIG. 3B, with the horizontal axis 361 corresponding to values of x, and the vertical axis 362 representing values of ƒ(x)*g(x). As discussed with reference to graph 330, when x=1, ƒ(x)*g(x)=0, and therefore the point (1,0) 363 is plotted in graph 360. Graph 332 shows superposition of the functions ƒ(α) and g(x−α) when x=2. Again, the positive portions of the two functions do not overlap, so that the product of the two functions is 0, regardless of the value of α. Therefore, the point (2,0) 364 is plotted in graph 360. Graph 334 illustrates the superposition of functions ƒ(α) and g(x−α) when x=2.25. In this case, the two functions do overlap in a small, cross-hatched region 335 with dimensions 0.025 and 0.5. Thus, integration of the product of the functions ƒ(α) and g(x−α), when x=2.25, over all values of α is the cross-hatched area 335 in FIG. 334, or ⅛. Thus, a point is plotted in graph 360 at (2.25,0.125). The remaining graphs in FIG. 3B 336, 338, 340, 342, and 344 illustrate computation of the value of ƒ(x)*g(x) at increasing values of x, and for each graph, a corresponding point is plotted in FIG. 360. Because the convolution is a continuous function, the points in 360 are connected by line segments to reveal the graph of the convolution function ƒ(x)*g(x). Thus, convolution of a pair of functions can be imagined as mirroring the second function of the pair of functions through the y axis and then moving that reflected function along the horizontal axis, corresponding to the independent variable α, for each position of the reflected function calculating the area of overlap of the pair of functions to produce the value of the convolution of the two functions at that position.

As with many types of operations in mathematics, the one-dimensional convolution, described above, can be extended to a two-dimensional convolution operation:

$$f(x,y)*g(x,y) = \iint f(\alpha,\beta) y(x-\alpha, y-\beta) d\alpha \, d\beta$$

Moreover, there is a discrete form of the convolution operation:

$$f_e(x, y) * g_e(x, y) = \frac{1}{MN} \sum_{M=0}^{M-1} \sum_{N=0}^{N-1} f_e(m, n) g_e(x - m, y - n)$$

where $f_e(x,y)$ and $g_e(x,y)$ are extended versions of ƒ(x,y) and g(x,y), respectively, mapped to two-dimensional domains of dimensions M×N.

Figure 4:
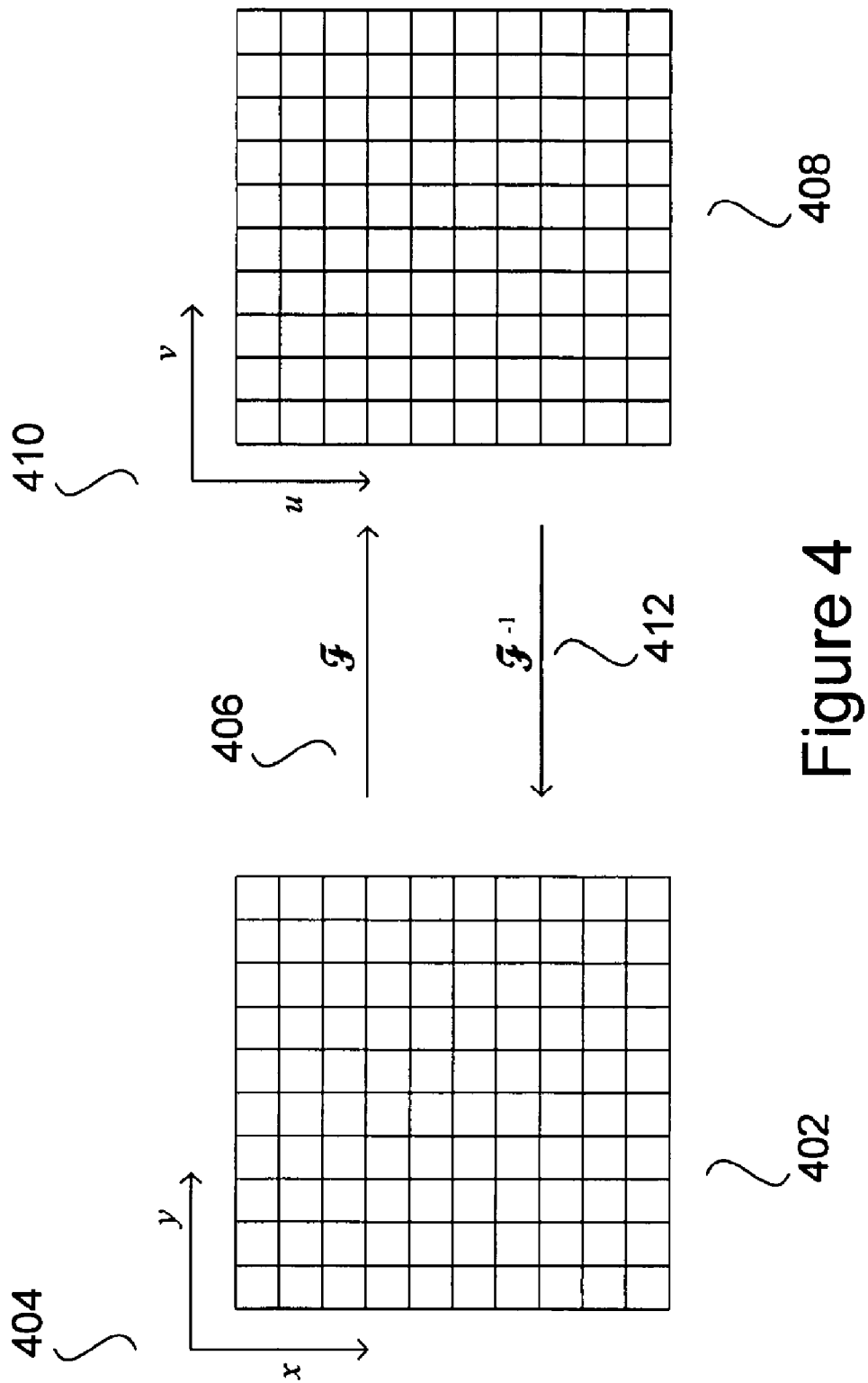
FIG. 4 illustrates a two-dimensional Fourier transform and a two-dimensional inverse Fourier transform.

The Fourier transform is an exceedingly useful mathematical transformation for many different image-processing operations. FIG. 4 illustrates a two-dimensional Fourier transform and a two-dimensional inverse Fourier transform. A normal image 402 produced by a digital camera or other image-acquisition device is a spatial-domain image. In other words, locations with respect to the x and y axes 404 within an image correspond to spatial positions of image features, in turn related to the positions of light-reflecting or light-emitting objects and surfaces that are being imaged. A Fourier transform ℑ 406 maps a spatial-domain image 402 to a frequency-domain image 408 corresponding to the spatial-domain image. The frequency-domain image contains values representing the frequencies of periodically repeated features in the spatial-domain image. The Fourier transform, or frequency-domain, image 408, has coordinate axes 410 u and v, with increasing values of u and v corresponding to increasing frequencies. Because of the inverse relationship between frequency and period, distances along the u and v axes in a frequency-domain image are inversely related to spatial distances along the x and y axes of a spatial-domain image. An inverse Fourier transform $ℑ^{-1}$ 412 transforms the frequency-domain image 408 back to the spatial-domain image 402. Two-dimensional Fourier transform and inverse Fourier transform can be expressed as:

$$\Im(f(x, y)) = F(u, v) = \int_{-\infty}^{\infty}\!\!\int f(x, y) e^{-i2\pi(ux+vy)} dx\,dy$$

$$\Im^{-1}(F(u, v)) = f(x, y) = \int_{-\infty}^{\infty}\!\!\int F(u, v) e^{i2\pi(ux+vy)} du\,dv$$

and a discrete Fourier-transform pair corresponding to the above continuous Fourier transform pair can be expressed as:

$$F(u, v) = \frac{1}{MN} \sum_{x=0}^{M-1} \sum_{y=0}^{N-1} f(x, y) e^{-i2\pi\left(\frac{ux}{M} + \frac{vy}{N}\right)}$$

$$f(x, y) = \sum_{u=0}^{M-1} \sum_{v=0}^{N-1} F(u, v) e^{i2\pi u\left(\frac{ux}{M} + \frac{vy}{N}\right)}.$$

Figure 5:
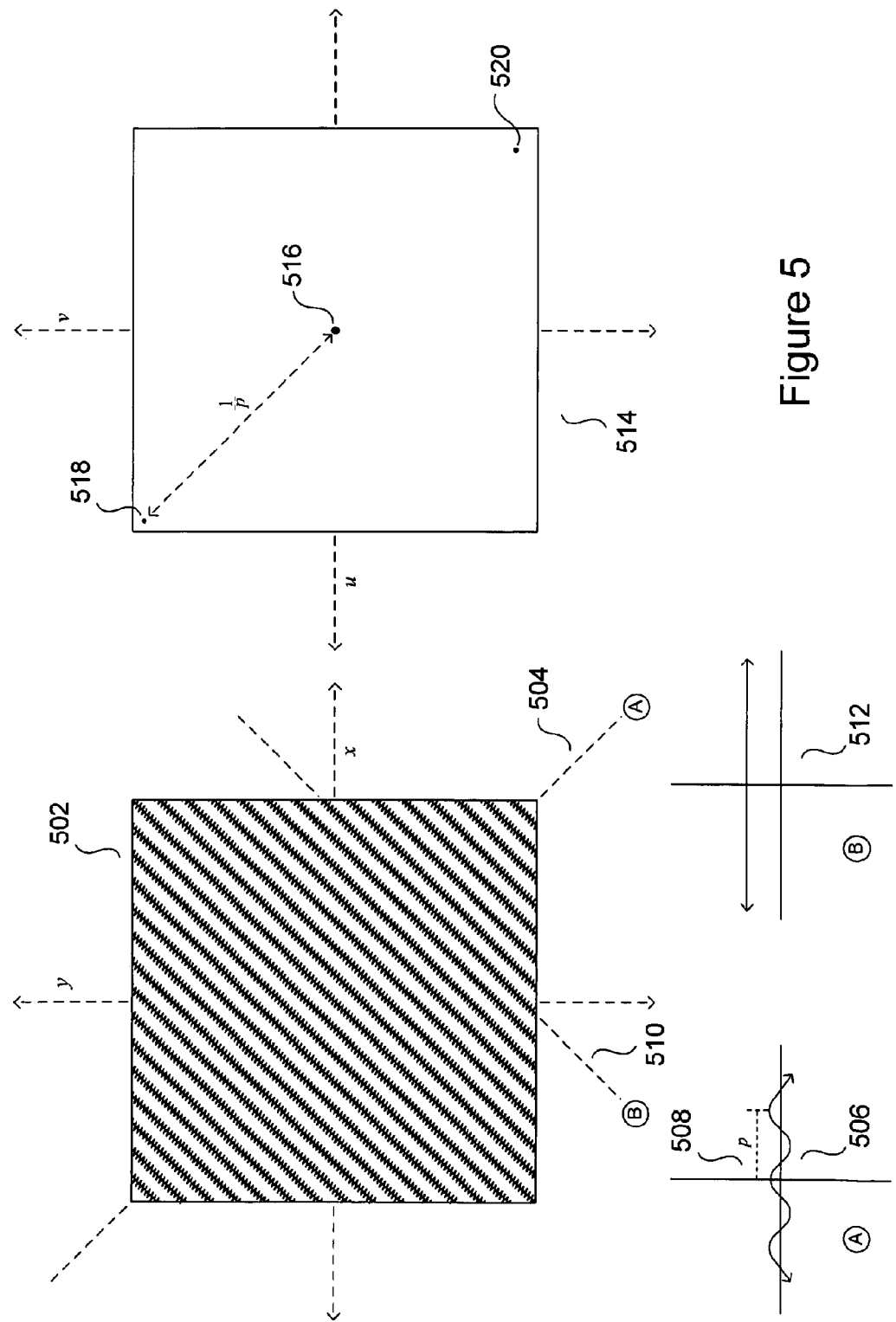
FIG. 5 illustrates one example of a spatial-domain image and its corresponding frequency-domain image.

FIG. 5 illustrates one example of a spatial-domain image and its corresponding frequency-domain image. The spatial-domain image 502 consists of a two-dimensional sinusoid centered diagonally with respect to the x and y axes. As shown in FIG. 5, viewing the sinusoid normal to line A 504, one observes a sinusoid function graphed in graph 506 with period p 508. Viewing the sinusoid normal to the line 510, one observes a constant function graphed in graph 512 that represents the peak amplitude of the sinusoid. The frequency-domain image 514 corresponding to the spatial-domain image 502 consists of a central point 516 and two additional points 518 and 520 along a diagonal line orthogonal to the peaks and troughs of the sinusoid in the spatial domain, with point 518 at a distance from the central point 516 proportional to 1/p. In fact, frequency-domain images generally have complex values, so the magnitudes of the complex values are generally plotted in frequency-domain representations. The Fourier transform produces a symmetric image with respect to the origin, so point, 520 is the symmetric counterpoint of point 518. The example illustrated in FIG. 5 is particularly simple. In general, a complex image in the spatial domain generally produces a complex, and impossible to visually interpret, frequency-domain image.

One use for the Fourier transform in image processing is to simplify various image-processing-related operations. Multiplication of two functions $f(x,y)$ and $g(x,y)$ in a spatial domain corresponds to the convolution of the Fourier transforms of the two functions in the frequency domain, and vice-versa:

$$f(x,y)g(x,y) \Leftrightarrow F(u,v)*G(u,v)$$

$$f(x,y)*g(x,y) \Leftrightarrow F(u,v)G(u,v)$$

By using Fourier transforms, certain operations involving convolutions, which are computationally intensive operations involving repeated integrations of the product of two functions for each point in the domain of the convolution, can be more efficiently carried out by transforming the two functions to the frequency domain, carrying out a multiplication of the two functions in the frequency domain, and then employing an inverse Fourier transform to return the product of the frequency domain functions back to the spatial domain. In certain cases, filtering operations, such as low-pass filtering and high-pass filtering, are much more easily carried out in the frequency domain than in the spatial domain. Low-pass filtering can be used to remove noise, and high-pass filtering can be used to sharpen images. However, high-pass filtering, in the frequency domain, generally introduces or amplifies noise and low-pass filtering in the frequency domain tends to blur images, once the filtered frequency-domain images are returned to the spatial domain.

Various types of deterministic corruption, such as blurring due to lack of optical focus or to motion of an image-acquisition device relative to the real-world objects producing the image, can be represented or modeled as the element-by-element convolution of the ideal image with a kernel, essentially a very small neighborhood of elements, with the image. For example, motion-induced blurring can be modeled as:

$$B = I \hat{x} K$$

where
B is the blurred image;
K is a blur kernel;
$\hat{x}$ is the convolution operator; and
I is the original image.

In one model for motion-induced blurring, the kernel consists of a square matrix of k elements, each having the value 1/k. In the spatial domain, there is no simple, direct inverse convolution operator, or deconvolution operator. Deconvolution of the blurred image B, even when the blur kernel K is known, is not an easy task. However, as mentioned above, when transformed to the frequency domain, the transform of the blurred image B is equal to the element-by-element product of the transform of the ideal image I and the transform of the blur, kernel K:

$$F(B) = F(I) \cdot F(K)$$

Therefore, in the frequency domain, the transform of the ideal image can be straightforwardly obtained by element-by-element division:

$$F(I) = F(B)/F(K)$$

Once the transform of the ideal image is obtained, the ideal image can be generated by a reverse Fourier transform:

$$I = \mathfrak{I}^{-1}(F(B)/F(K))$$

An equivalent approach to deblurring in the spatial domain involves matrix inversion. In the spatial domain, the blurred image B can be modeled as multiplication of the ideal image I by a blur-operator matrix M, as follows:

$$B = IM$$

where M=blur operator matrix of same dimension as I and B Provided that M is invertible, the ideal image I can be obtained by multiplication of both sides of the above equation by the inverse blur-operator matrix $M^{-1}$:

$$BM^{-1} = IMM^{-1} = I$$

However, matrix inversion is generally a much more computationally demanding task than a Fourier transform to the frequency domain, division in the frequency domain, and a reverse Fourier transform back to the spatial domain. Therefore, most deconvolution algorithms are implemented in the frequency domain. However, a corrupted image may not contain sufficient information with respect to the corresponding ideal image to allow for an exact deconvolution in the frequency domain. In other words, in the frequency domain, certain additional information and/or numerical values may need to be obtained or supplied in order to deconvolve a blurred image.

As one example of the need for additional information in frequency-domain deconvolution, the division operation in the frequency domain, discussed above, that corresponds to deconvolution in the spatial domain is not defined for those elements of the Fourier transform of the blur kernel with the value "0." If an element of the Fourier transform of the blur kernel has one or more "0" values, one or more non-"0" values must be substituted for the "0" values to produce a defined value for F(I). These values that are chosen to replace the "0" values in the Fourier transform of the kernel may generate periodically repeating artifacts and distortions, referred to as "ringing," in the spatial-domain approximation to the ideal image obtained by the reverse Fourier transform of the deconvolved, frequency-domain blurred image.

Figures 6A, 6B:
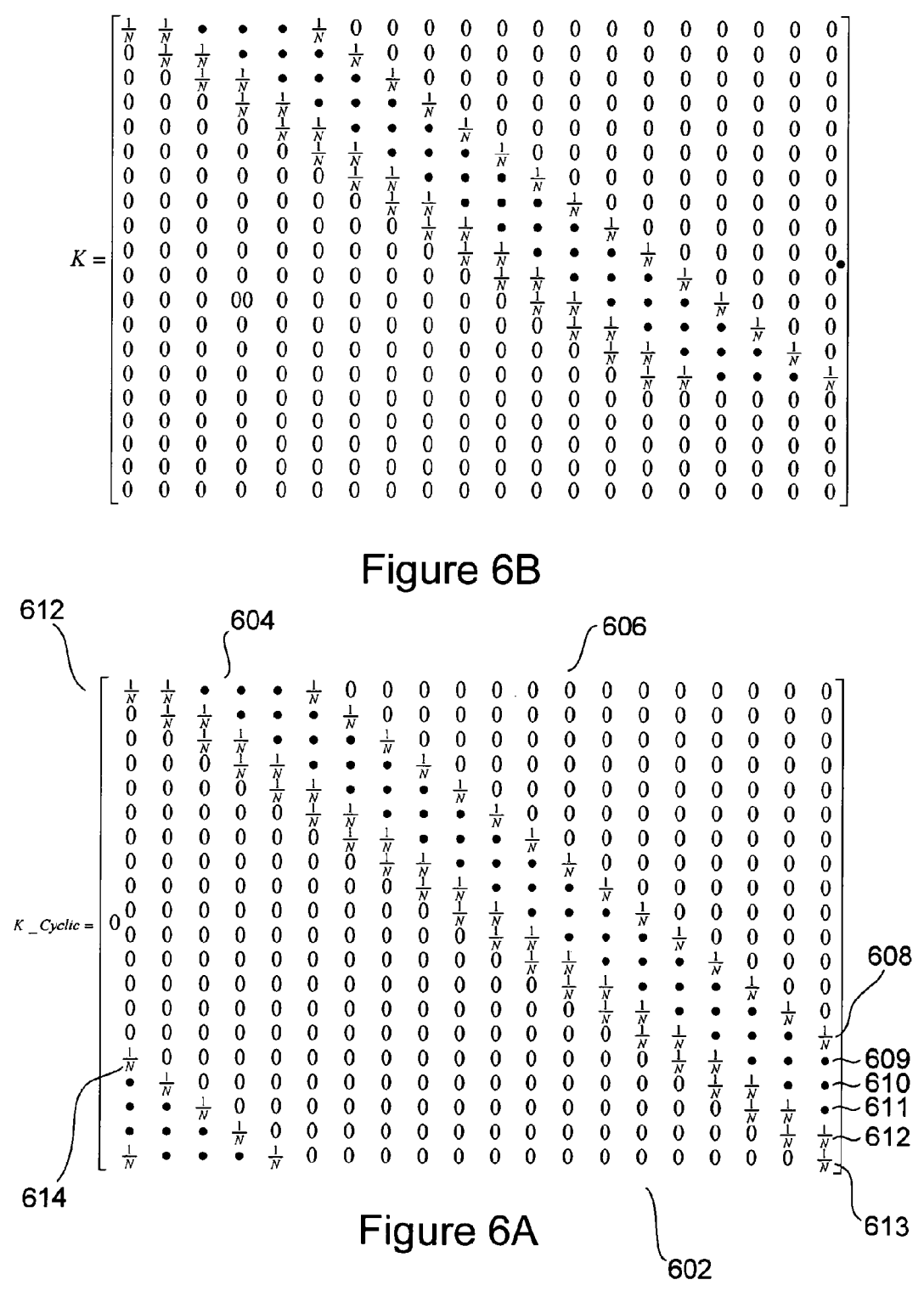

Another problem with frequency-domain deconvolution is that frequency-domain-deconvolution methods generally assume a circulant blur of the image, but actual image blurring is poorly modeled by a circulant blur kernel. In the spatial domain, this circulant-blur-kernel assumption can be eliminated, although additional spatial-domain information is needed to properly model image blurring. FIG. 6A shows an exemplary circulant blur kernel for a one-dimensional signal. A sequence of N consecutive elements in each row of the circulant blur kernel have non-"0" values. For example, in the $0^{th}$ row 602, a sequence of N initial elements 604 each have the value 1/N and the remaining elements have the value "0" 606. The starting position of the N non-"0" elements is shifted rightward by one element in each subsequent row, forming a diagonal stripe that descends to the right through the body of the circulant blur kernel 602. When the sequence of non-"0" values reaches the right-hand boundary of the circulant kernel, in row 14 608, then, in subsequent rows 609-613, the sequence of N non-"0" elements wraps around to the beginning of the row. For example, in row 609, the sequence of N non-"0" values extends by one element past the right-hand boundary of the circulant kernel, and therefore the last non-"0" element wraps around to the first element of the row 614. However, although use of circulant blur kernels is mathematically convenient for frequency-domain deconvolution methods, physical blurring is better modeled by a non-circulant blur kernel. FIG. 6B shows a non-circulant blur kernel. Assuming a circulant blur kernel when the physical blur kernel is non-circulant leads to a reconstruction error E:

$$E = R - I$$

The Fourier transform of the construction error can be computed to be:

$$F(E) = \frac{F(B - B_{cyclic})}{F(K_{cyclic})}$$

where $B_{cyclic}$ is the blurred image;

$B_{cyclic}$ is a blurred image produced using a circulant blurred kernel; and $K_{cyclic}$ is the circulant blur kernel.

Thus the magnitude of the construction error will be large in boundary regions of the image where the actual blurred image B differs substantially from the blurred image produced using a circulant kernel $B_{cyclic}$ as well as where the magnitudes of elements in the Fourier transform of the circulant blur kernel are small. The error is manifested, when the deconvolved frequency-domain image is transformed back to the spatial domain, as periodic artifacts, aberrations, and distortions.

The periodic artifacts, aberrations, and distortions in the spatial-domain image obtained by frequency-domain deconvolution, discussed above, are two examples of various types of artifacts, aberrations, and distortions produced by frequency-domain deconvolution. A major problem in frequency-domain deconvolution is that various types of spatial-domain information that might be used to choose which of different possible values to use in the frequency domain is either unavailable in the frequency domain or is distributed throughout the frequency-domain image in very complex ways. In order to avoid the aberrations, distortions, and artifacts introduced into a reconstructed image by frequency-domain deconvolution, methods and systems of the present invention carry out image restoration entirely within the spatial domain.

Figure 7:
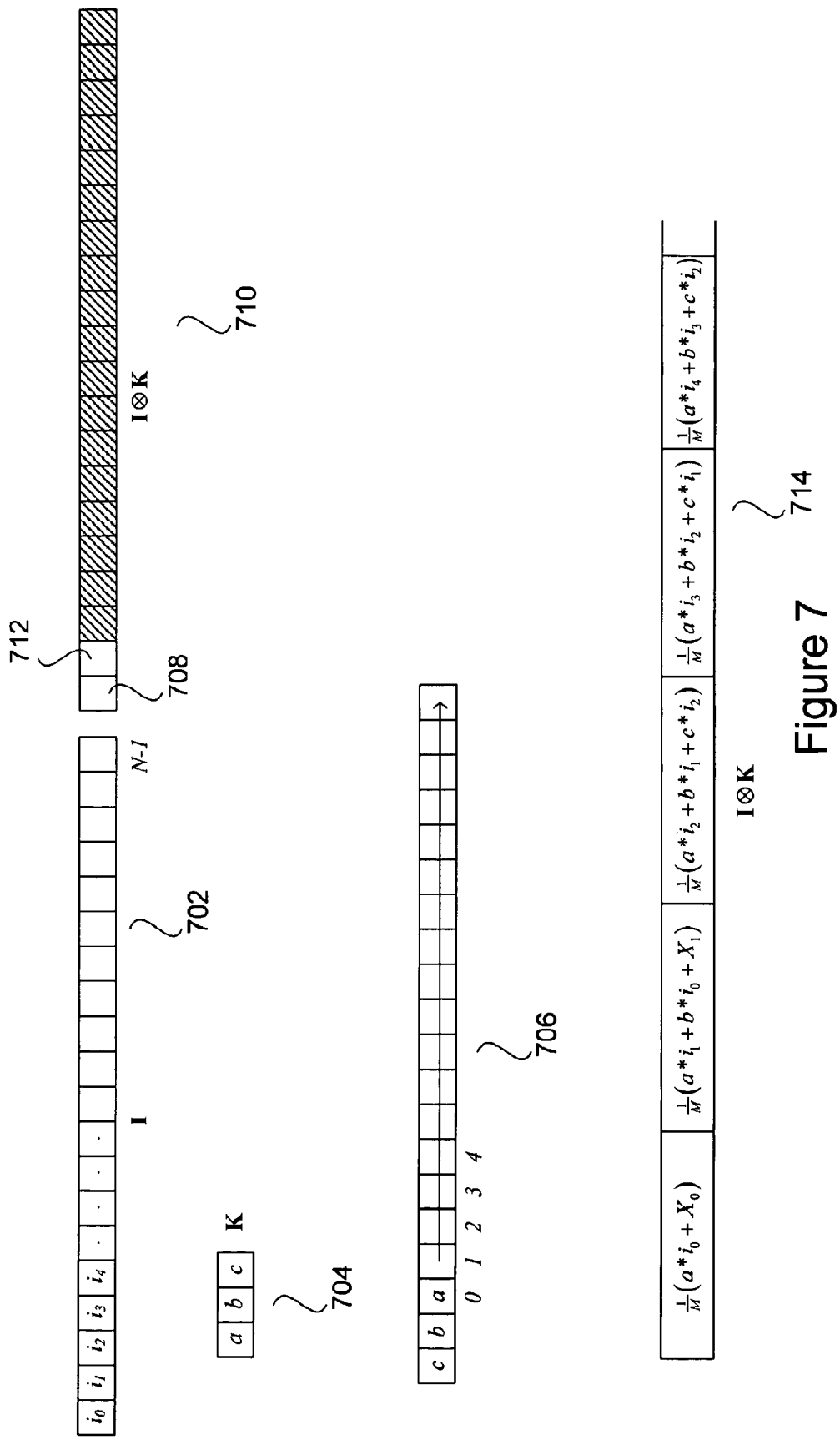
FIG. 7 illustrates convolution of a one-dimensional ideal image I with a three-element linear blur kernel K.

FIG. 7 illustrates convolution of a one-dimensional ideal image I with a three-element linear blur kernel K. The one-dimensional ideal image I 702 is a linear array of intensity values $i_0, i_1, i_2, \ldots i_{N-1}$. The linear blur kernel K is a three-element array 704 containing values represented by the symbols "a," "b," and "c." The convolution operation begins by superimposing the first element of the inverted linear kernel K, containing the value "a," over the $0^{th}$ element of the ideal image I, as shown in the depiction 706 in FIG. 7. A first element of the convolution Ix̂K can be generated by adding products of all overlapping values of the inverted linear kernel and the ideal image. In the first position, in which the final element of the inverted kernel overlaps with the first element of the ideal image, a three-term sum of products cannot be generated without using additional padding or default values. Thus, the first element 708 of the convolution Ix̂K 710 cannot be fully determined from linear-kernel and ideal-image values. Next, the kernel is shifted rightward by one element, and a three-term sum of overlapping products is again attempted to be generated. However again, there is not complete overlap of the inverted linear kernel and ideal-image elements, with the first element of the inverted linear kernel, contained in the value "c," extending past the left-hand boundary of the ideal image. Therefore, the second element 712 of the convolution IxK cannot be fully determined from the linear-kernel and ideal-image values. Next, the inverted linear kernel is shifted rightward by yet another element. At this point, the inverted linear-kernel value "a" overlaps the ideal-image value $i_2$, the inverted linear-kernel value "b" overlaps the ideal-image value and the inverted linear kernel value "c" overlaps the ideal-image value $i_0$. In this case, a full three-term sum of products of overlapping values can be computed. In another representation of the convolution IxK 714 in FIG. 7, algebraic expressions are provided for the convolution values. The first two expressions contain unknowns $X_0$ and $X_1$, respectively, to indicate arbitrary values needed to complete overlap of the inverted linear kernel with the ideal image to generate the first two elements of IxK. All subsequent values are exactly specified by algebraic expressions. In general, each expression is a three-term sum of the product of overlapping inverted-linear kernel values and ideal-image values, the three-term sum multiplied by a constant value 1/M.

Figure 8A:
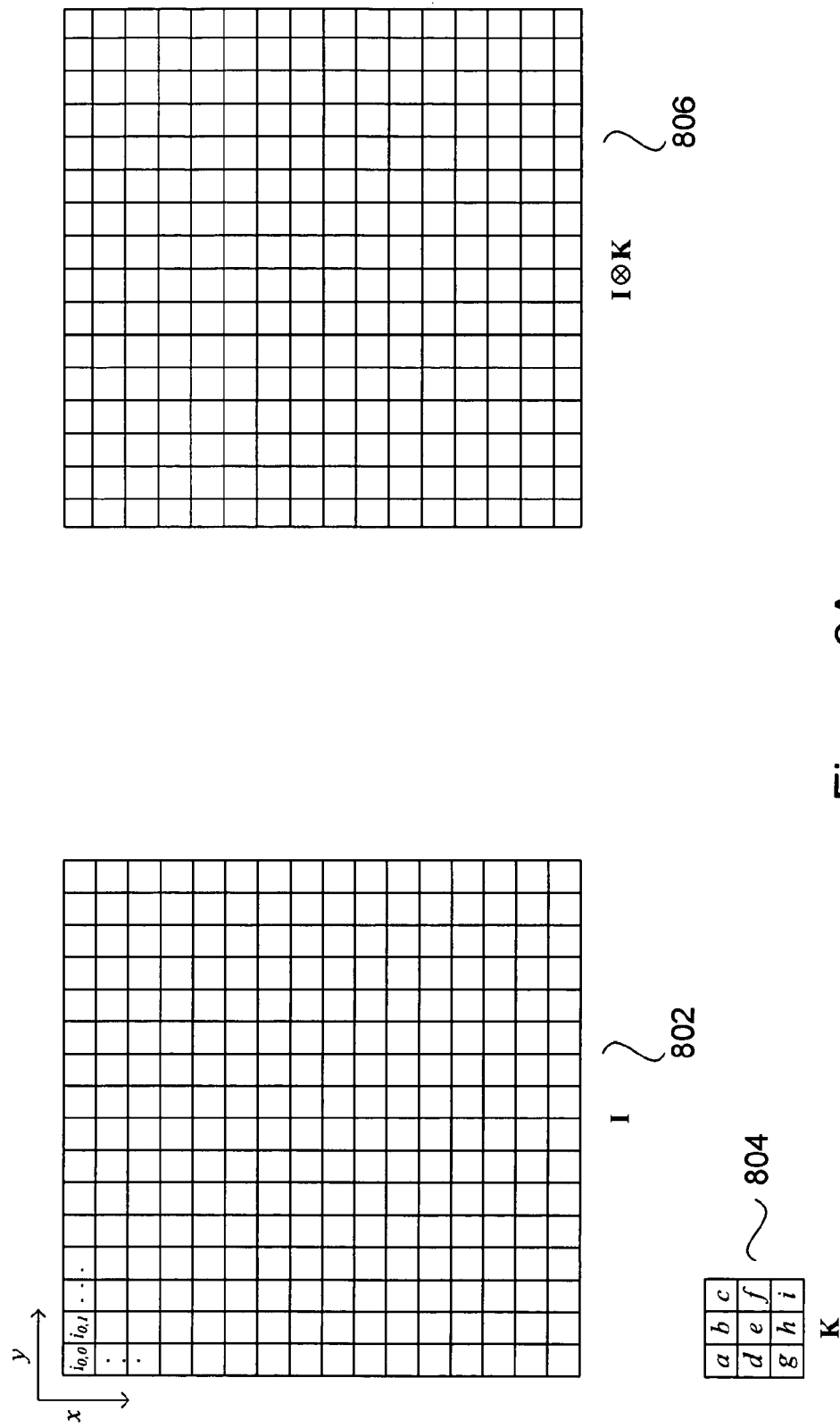
Figure 8C:
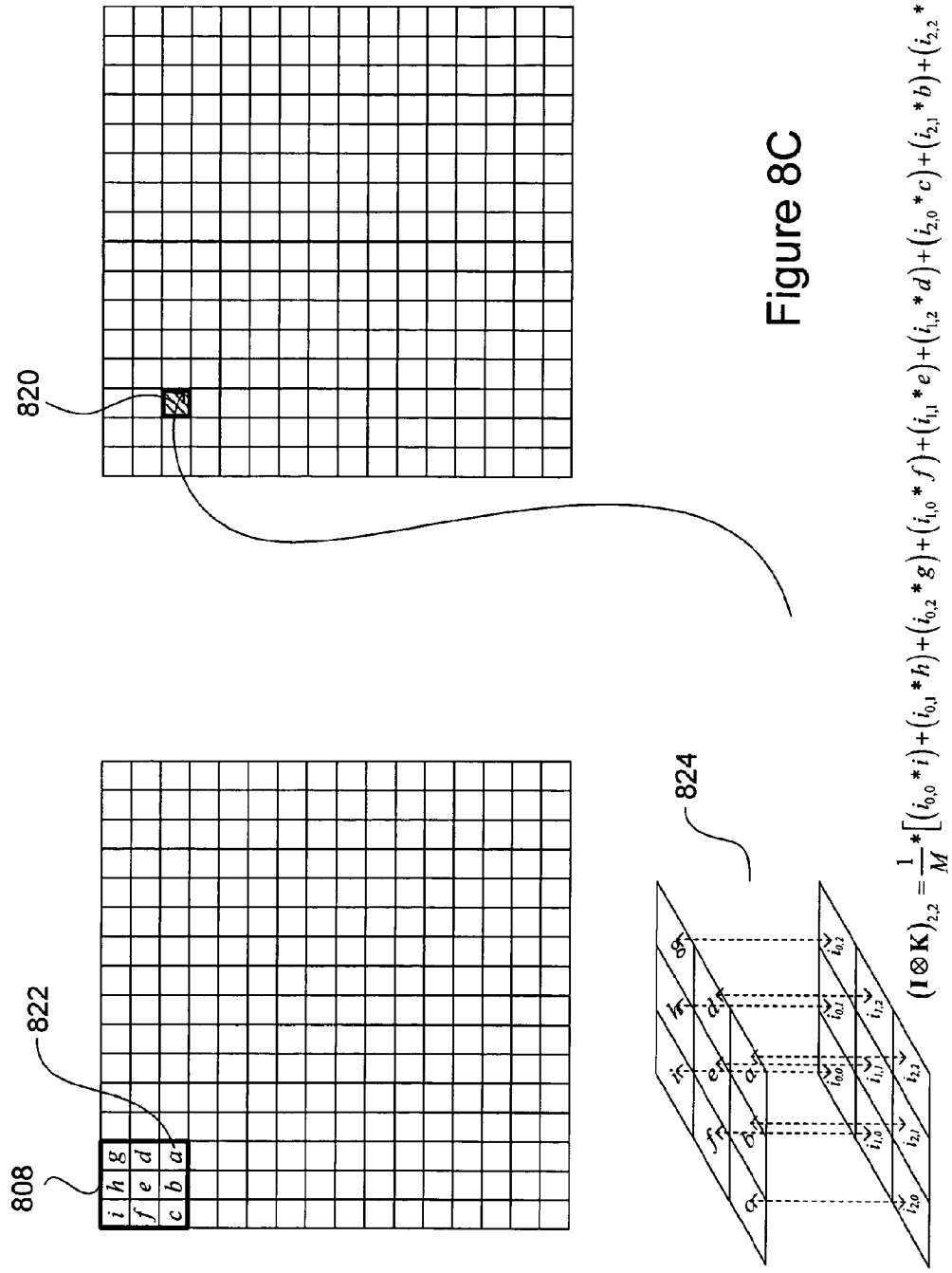

FIGS. 8A-D illustrate convolution of a two-dimensional ideal image I with a two-dimensional blur kernel K. FIG. 8A shows the two-dimensional ideal image I 802, the two-dimensional blur kernel K 804, and the convolution image IxK 806. FIG. 8B illustrates the convolution process. First, the two-dimensional blur kernel is inverted about its central element to produce an inverted two-dimensional blur kernel 808 which is placed in initial position with the right-most and lowest-most inverted two-dimensional kernel element containing the value "a" superimposed over the first element of the ideal image. In each position, a nine-term sum of overlapping products is attempted to be computed as the value for a corresponding element of the convolution IxK. The curved arrow 810 in FIG. 8B shows one possible path for application of the inverted two-dimensional convolution kernel to the ideal image in order to compute corresponding values of the convolution IxK 806. FIG. 8C illustrates the computation of convolution element (2,2). The convolution element (2,2) 820 is computed by overlaying the inverted two-dimensional blur kernel 808 in a position in which the element of the inverted two-dimensional blur kernel containing the value "a" is superimposed over ideal-image element (2,2) 822. In that position, a full nine-term sum of products can be computed as shown by the overlapping inverted two-dimensional blur kernel and overlapped region of the ideal image 824. As shown in FIG. 8D, exact convolution values for a vertical 830 and a horizontal 832 border region of the convolution IxK 806 cannot be determined, due to incomplete overlap of the inverted two-dimensional blur kernel with the ideal image in positions of the inverted two-dimensional blur kernel needed to compute corresponding values in the boundary regions. Exact values without padding values or other arbitrary values can be computed for the cross-hatched portion of the convolution 834.

Figure 9:
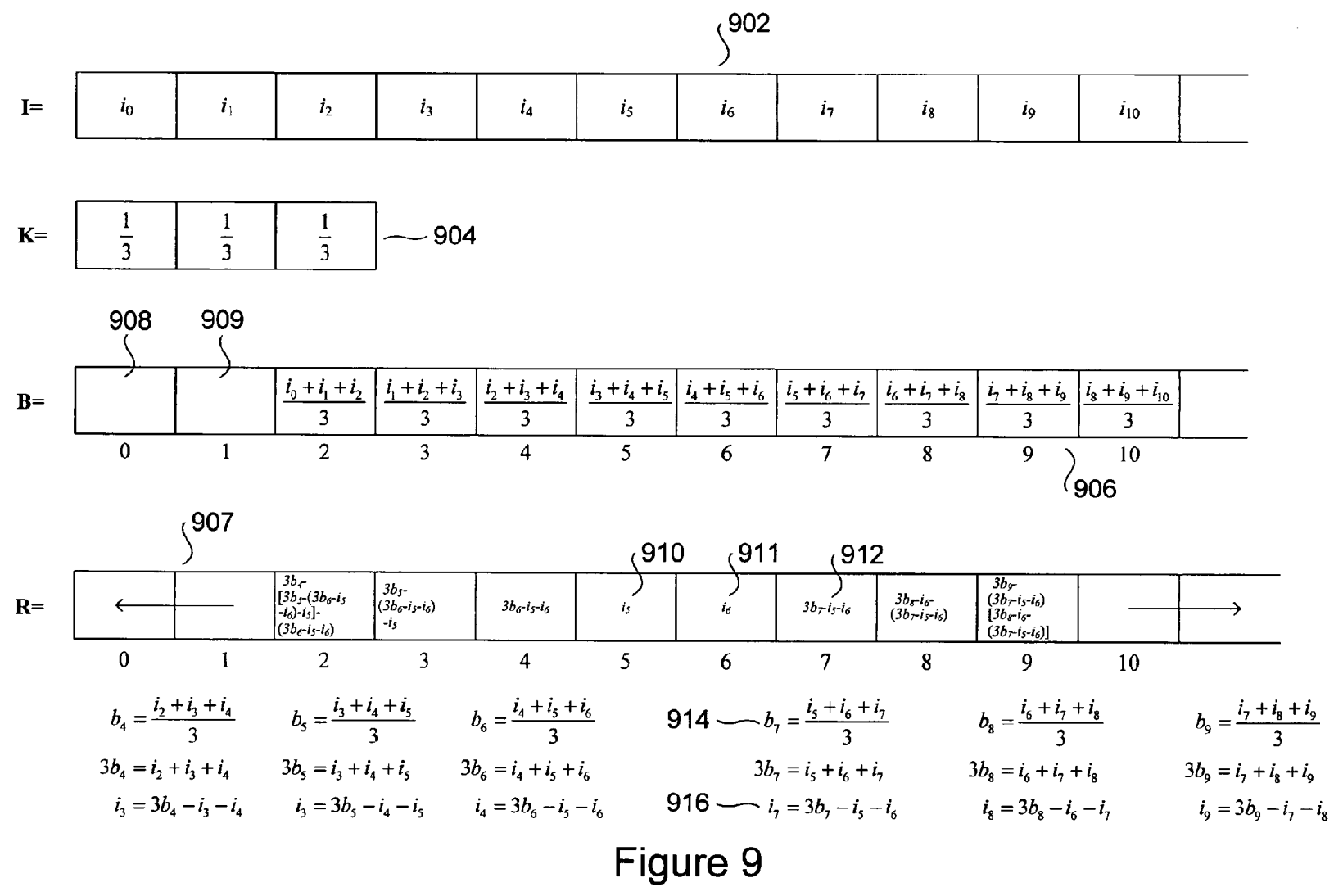

FIG. 9 provides greater detail with regard to the linear convolution described with reference to FIG. 7. FIG. 9 again shows the ideal linear image 902, a three-element linear blur kernel 904, the blurred image 906 produced by convolution of the ideal image with the linear blur kernel, and a restored image 907. As discussed above, the first two elements of the blurred image 908-909 cannot be specified as an expression of linear-blur-kernel values and ideal image values. However, if any two contiguous values of the restored image can be determined or assumed, such as the values 910 and 911 for restored-image elements $R_5$ and $R_6$, then all additional values within the restored image can be exactly computed. FIG. 9 includes the algebraic computations of three restored-image element values on both sides of the contiguous, two-element known region 910 and 911. For example, to compute the exact value of $R_7$ 912, the expression for the blurred-image value $B_7$ 914 is used to derive an expression for the ideal-image value $I_7$ 916, with the ideal-image value $I_7$ being the exact value needed for element $R_7$ of the restored image 907. Observing the expressions in the restored image 907 in FIG. 9, one can easily appreciate that the derivations of the values are recursive, in nature. Generalized recursive expressions for elements of R, are:

$$R_i = 3 \cdot B_i - R_{i-1} - R_{i-2}$$

$$R_i = 3 \cdot B_{i+2} - R_{i+1} - R_{i+2}$$

Figure 10:
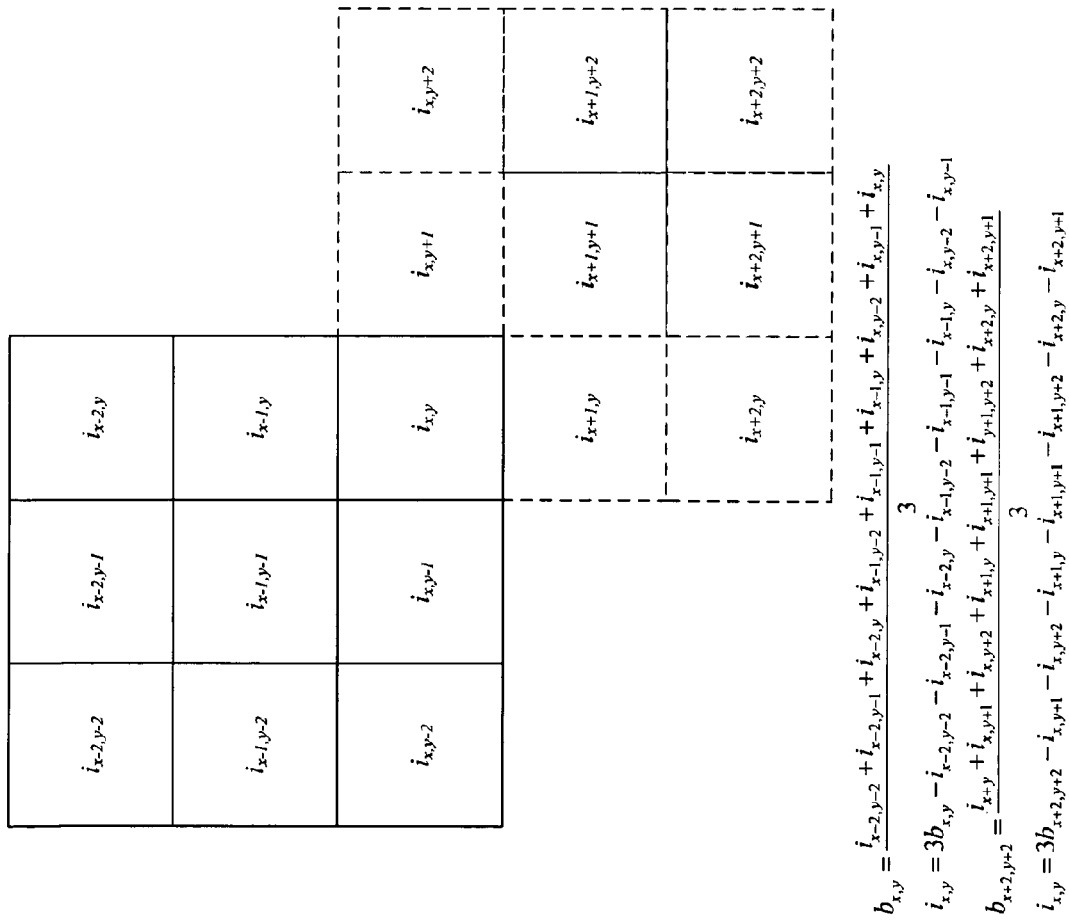
FIG. 10 illustrates that the exact value for the element $R_{x,y}$ of a two-dimensional restored image can be algebraically computed from previously computed restored-image values and from a blurred-image value in similar fashion to computation of restored-image values for the linear restored image illustrated in FIG. 9.

FIG. 10 illustrates that the exact value for the element $R_{x,y}$ of a two-dimensional restored image can be computed from previously computed restored-image values and from a blurred-image value in similar fashion to computation of restored-image values for the linear restored image illustrated in FIG. 9. In FIG. 10, restored-image value $R_{x,y}$ 1002 is shown to be computable from the corresponding blurred-image element value $B_{x,y}$ and previously computed restored-image values or from the blurred-image value $B_{x+2,y+2}$ and previously computed restored-image values. In fact, there are many additional ways to compute restored-image value $R_{x,y}$ from blurred-image values and already-computed restored-image values in the two-dimensional case. Thus, a number of recursive expressions can be obtained for computing two-dimensional restored-image values from values of a corresponding blurred image and from previously computed restored-image values.

The fact that exact values of a restored image can be computed from a small number of known or determined values of a restored image is used as a basis for a family of spatial-domain image restoration processes. FIG. 11 illustrates application of a spatial-domain image-restoration technique to a one-dimensional blurred image. First, a linear blurred image 1102 is received. Next, the linear blurred image is analyzed to identify a contiguous set of a sufficient number of elements for recursive restoration having least variance in intensity values in the linear blurred image. In FIG. 11, the least-varying sequence of three blurred-image elements 1104 is shown in cross-hatch. In this case, a four-element linear blur kernel is assumed, and therefore three initial values are needed in order to apply the above-discussed recursive techniques to generate the restored-image values. The contiguous set of least varying values are then transferred directly to the restored image 1106 and the recursive techniques are applied both in a forward direction 1008 and in a backward direction 1110 in order to generate the restored image. It is a reasonable assumption that regions within a blurred image with low variance are most probably least affected by the blurring operation. For example, in an image featuring a wide expanse of blue sky, a blurring operation representing motion-induced blurring of the image probably has little effect on the interior portions of the cloudless-sky region of the image, since the cloudless-sky region of the image is of fairly constant intensity and hue, and is therefore unaffected by small positional shifts corresponding to motion of the image-acquisition device. FIG. 12 illustrates the spatial-domain image-restoration technique, discussed with reference to FIG. 11, applied to a two-dimensional blurred image. The received two-dimensional blurred image 1202 is analyzed to determine a minimally-varying region of sufficient size and configuration to allow regeneration of a restored image using recursive techniques. The region of small variance 1204 of the blurred image is transferred directly to the restored image 1206 and element-by-element recursive techniques are applied, as indicated by the arrows, such as arrow 1208, to generate restored-image values for the remaining elements of the restored image 1210.

Figure 13:
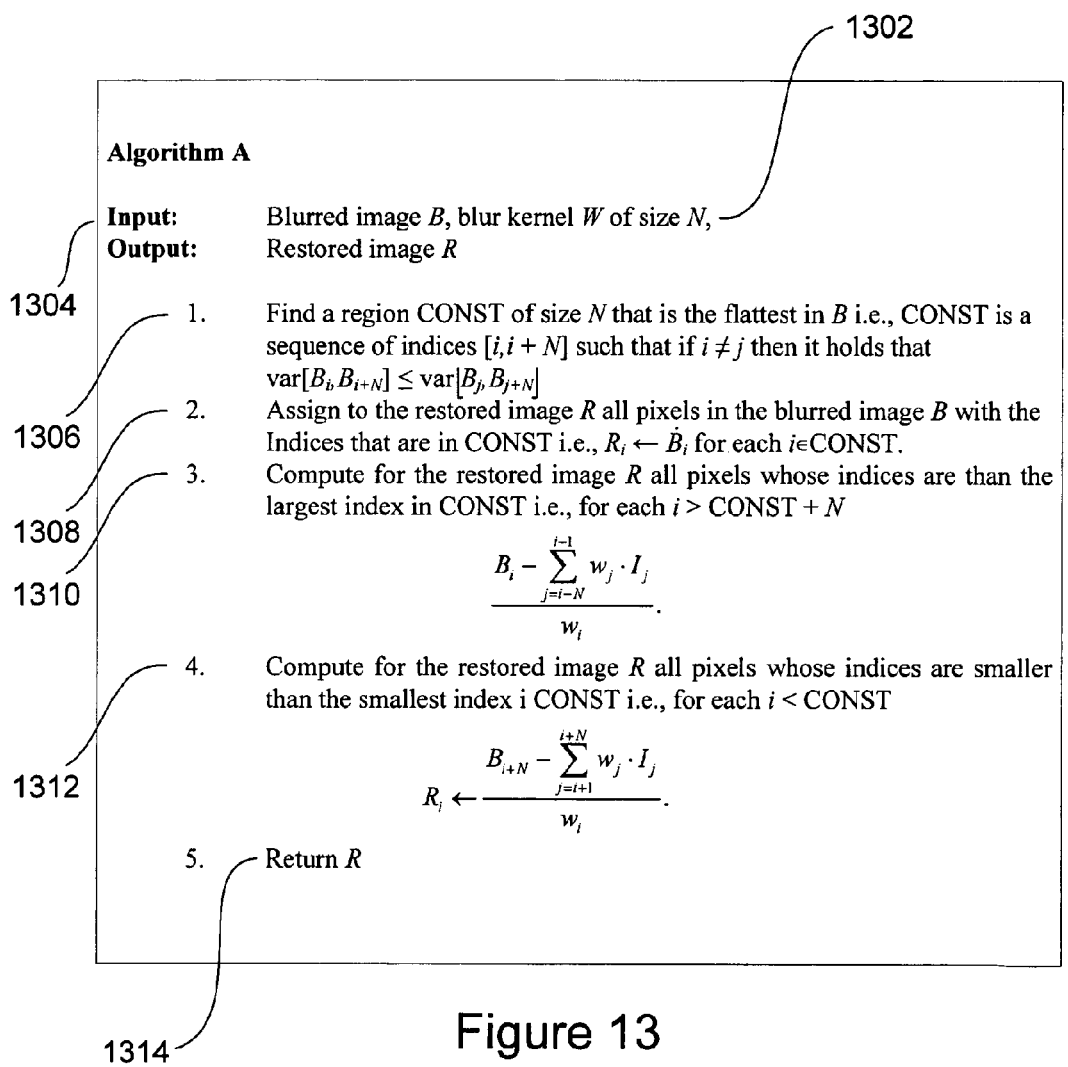
FIG. 13 provides an algorithm for spatial-domain restoration of one-dimensional images, as discussed with reference to FIGS. 7-12.

FIG. 13 provides an algorithm for spatial-domain restoration of one-dimensional images, as discussed above with reference to FIGS. 7 and 9. A blurred image and a blur kernel are input, on line 1302 and a restored image is output, as indicated on line 1304. In a first step 1306, a least-varying subsequence of contiguous elements is determined and the values of those elements are assigned to corresponding elements of the restored image in a second step 1308. Then, in a third step 1310, all remaining element values with larger indices than the element values assigned in the second step are recursively computed, and, in a fourth step 1312, all restored-image element values with indices less than the smallest index of an element value assigned in the second step are computed recursively. The restored image is then returned 1314.

A matrix-algebra-based spatial-domain restoration process somewhat more general than the recursive spatial-domain image-restoration process discussed above with reference to FIGS. 7-13 is next described. FIGS. 14A-D illustrates a matrix-algebra expression equivalent to the above-discussed 3-element blur-kernel convolution process by which deterministic blurring of an ideal one-dimensional image can be modeled and a physical, blurred image restored. The ideal image I 1402 is represented as a column vector, and a computed blurred one-dimensional image $B_c$ 1404 is also represented as a column vector. Multiplication of the ideal-image column vector I by a transfer matrix H 1406 that mathematically represents the above-discussed blur equations produces the computed blurred-image column vector $B_c$ 1404. Note that, as discussed above, due to incomplete information, the computed blurred-image column vector $B_c$ has fewer elements than the ideal-image column vector I. In general, when the ideal image has n elements, and the blur kernel has k elements, only n−k+1 blur equations are obtained, and thus only n−k+1 elements of the blurred-image column vector can be computed. It would be desirable, were a properly dimensioned transfer matrix H available, to compute a restored image R equivalent to the ideal image I from an actual, physical blurred image B by matrix inversion, as follows:

$$B = HI$$

$$H^{-1}B = H^{-1}HI = I = R$$

As shown in FIG. 14B, one approach is to attempt to produce a restored image of dimension equal to that of the computed blurred-image column vector $B_c$ and physical blurred image B. The ideal image I can be viewed as containing a greater number of pixels than a physical image, since, as the camera is moved to produce a blurred image, a greater number of pixels are sampled than can be recorded. In other words, a larger number of points in real space contribute to the captured image than would contribute to the captured image were the camera to have remained motionless. Thus, the size of the ideal image I 1408 is reduced to reflect the desired size of the restored image R. The reduction in size of the ideal image I correspondingly decreases the number of rows in the transfer matrix H 1410 and the computed blurred-image column vector $B_c$ 1412. Thus, the transfer matrix lacks sufficient rows to be square and is not invertible, as is required to generate a restored image R from a physical blurred image B.

One method for obtaining a properly dimensioned transfer matrix $\hat{H}$ that is close to the theoretical transfer matrix H needed to obtain a restored image R from a blurred image B is to find neighborhoods in B, desirably of at least size k, with least variance, and select from these neighborhoods central pixels that are likely unchanged by blurring. Smooth regions in the blurred image B are likely not to have been altered by the blurring process, as explained above. Then, additional rows can be added to the initial blur-equation-representing transfer matrix H in order to produce a properly dimensioned transfer matrix $\hat{H}$, with additional corresponding elements added to the computed blurred-image column vector $B_c$ to produce an extended computed blurred-image column vector $\hat{B}$. In the example of FIG. 14C, analysis of pixel-value variance in the blurred image B reveals that elements $b_2$ and $b_7$ of the blurred image B are the central pixels of least varying neighborhoods, and are thus likely equal in value to ideal-image pixels $i_2$ and $i_7$. Thus, two rows 1414 and 1416 are added to $\hat{H}$ 1418 to represent the likely equivalence of $b_2$ and $b_7$ to $i_2$ and $i_7$, respectively. Transfer matrix $\hat{H}$ is now square, and is also invertible, and therefore the inverted transfer matrix $\hat{H}^{-1}$ can be used to obtain a restored image R from a physical blurred image B by:

$$\hat{B} = \hat{H} \cdot I$$

$$\hat{B} \approx B$$

$$\hat{H} \approx H$$

$$\hat{H}^{-1} B \approx I$$

$$R = \hat{H}^{-1} B \approx I$$

It should be noted that the additional rows do not contradict the original rows corresponding to the blur equations. For example, the two rows that provide values for $b_2$ generate the equations:

$$b_2 = \frac{i_0 + i_1 + i_2}{3}$$

$$b_2 = i_2$$

By simple algebra, these two equations combine to produce:

$$2i_2 = i_0 + i_1$$

This is simply an additional constraint, and the two equations for $b_2$ do not constitute a contradiction of any kind. In FIG. 14D, the inverse matrix $\hat{H}^{-1}$ 1420 corresponding to transfer matrix $\hat{H}$ is shown in the last matrix equation. This method is, of course, straightforwardly extended to two-dimensional images.

The method of adding values to the transfer matrix is similar to the method of assigning initial values to the restored image in the recursive method. However, in the matrix-algebra-based spatial-domain image restoration method, the values need not be contiguous or sequential, and can be spread throughout the rows of the image. This a matrix-algebra-based spatial-domain image restoration method imposes less constraints, by allowing values extracted from small smooth areas, or even one or two pixels, of the blurred image B to be added to the blur-equation-derived transfer matrix H in order to extend the blur-equation-derived transfer matrix H to produce the properly dimensioned transfer matrix $\hat{H}$. It should be noted that, after each additional value is added to transfer matrix H to produce an extended matrix $H^+$, the determinate of the extended matrix $H^+$ needs to be taken to make sure that the determinate is non-zero, so that extended matrix $H^+$ is non-singular. Sufficient values are added to produce a square, invertible matrix $\hat{H}$. Thus, the extended matrix $H^+$ needs to be both square and invertible.

FIG. 15 provides an algorithm for spatial-domain restoration of one-dimensional images, as discussed with reference to FIGS. 14A-D. In a first step, a map of least-varying regions is obtained, used in the second step to construct additional rows of the transfer matrix H in order to obtain a properly dimensioned transfer matrix $\hat{H}$. It should be noted that information in addition to the information needed to produce a square transfer matrix $\hat{H}$ can be gleaned from the blurred image and incorporated into $\hat{H}$ by various methods.

When a deterministic-corruption kernel or matrix operation is known, and when all corruption in a corrupted image is deterministic and accurately modeled by a deterministic-corruption kernel or matrix operation, then either of the two above approaches for spatial-domain image restoration can be employed to produce sharp, high-quality restored images from corrupted images. However, as discussed above, most image-acquisition and image-encoding and image-processing systems introduce noise corruption into images in addition to deterministic corruption. Non-deterministic noise corruption cannot be modeled effectively by a convolution kernel or matrix operator. Therefore, the spatial-domain image-restoration methods of the present invention have been developed to produce high-quality restored images from corrupted images that include both deterministic corruption that can be modeled by convolution kernels and/or matrix operators as well as non-deterministic noise corruption. The methods of the present invention employ either closed-form image-restoration steps or employ optimization techniques with effective constraints to direct the optimization techniques to an acceptable restored image.

First, a few additional mathematical notation and techniques are described. The notation $\|A\|$ indicates some norm of matrix A. There are many different possible norms that can be computed for vectors and matrices. To be a norm, a computed value must have the following properties:

$$\|A\| \geq 0$$

$$\|A\| = 0 \text{ iff } A = 0$$

$$\forall \alpha \text{ in } K \text{ and } A \text{ in } K^{m \times n} : \|\alpha A\| = |\alpha| \|A\|$$

$$\forall A \text{ and } B \text{ in } K^{m \times n} : \|A + B\| \leq \|A\| + \|B\|$$

where K is a possibly infinite set of allowed values for $\alpha$ and A.

$\|A\|$ can be positive or "0," but is "0" only if the matrix A includes only zeros. The norm of a constant times a matrix is equal to the absolute value of the constant times the norm of the matrix, and the norm of the sum of two matrices is less than or equal to the sum of the norms of the two matrices. A norm is essentially a distance metric, and different norms respond to different methods of computing distances.

The gradient operator $\nabla$ can be applied to a scaler function to generate a vector at each position in the domain of the scaler function, according to:

$$\nabla f(x, y) = \frac{\partial f(x, y)}{\partial x} i + \frac{\partial (fx, y)}{\partial y} j$$

The absolute value of a gradient vector at the position (x,y) of function $f(x,y)$ is defined as:

$$|\nabla f(x, y)| = \left[ \left( \frac{\partial fx, y}{2x} \right)^2 + \left( \frac{\partial x, y}{\partial y} \right)^2 \right]^{1/2}$$

The gradient vectors are oriented in the direction of greatest change in value of the function at each point in the function. The magnitude of a gradient reflects the derivative of the function in the direction of greatest change. The notation $\nabla R$ refers to applying the differential operator $\nabla$ to a matrix R to generate the matrix $\nabla R$, each element of which is the magnitude of the gradient vector computed for the corresponding element of matrix R, as follows:

$$\nabla R \begin{bmatrix} |\nabla f(x_0, y_0)| & |\nabla f(x_0, y_1)| & \ldots \\ |\nabla f(x_1, y_0)| & |\nabla f(x_1, y_1)| & \ldots \\ \vdots & \vdots & \ddots \end{bmatrix}$$

The problem addressed by method embodiments of the present invention is to construct a restored image from the given blurred image B that has been corrupted both by deterministic degradation modeled by a degradation matrix $\hat{H}$ and additionally corrupted by non-deterministic noise. As discussed above, degradation matrix $\hat{H}$ is produced by extending a blur-equation-representing transfer matrix H with pixel-value-specifying rows obtained from pixel values in smooth regions of the given blurred image B. Addressing the problem as a traditional optimization or minimization problem, one approach would be to use an optimization technique to find R, the restored image, such that:

$$\|\hat{H} \cdot R - B\| \leq \epsilon$$

where $\epsilon$ is a constant that expresses a maximum allowed discrepancy between the restored image to which the degradation matrix $\hat{H}$ is applied and the blurred image B. Any of various matrix norms can be used in this optimization constraint, such as $\|\hat{H} \cdot R - B\|$. In other words, the constraint for the optimization or minimization problem is that, when the restored image is corrupted by deterministic degradation modeled by the degradation matrix $\hat{H}$, the deterministically corrupted restored image should not differ greatly from the blurred image being restored. Were the degradation matrix H to correctly models the corruption, this constraint would be sufficient to direct optimization to a restored image within some distance bound from the ideal image. However, when noise corruption is present, this constraint does not force the optimization method to account for noise corruption in addition to deterministic degradation.

The following constraint may be used to direct an optimization technique toward a denoised restored image R corresponding to a noise-corrupted image N:

$$\|\nabla R\| \leq E$$

where E is an upper bound for smoothness of the restored image. Note that $\nabla R$ contains magnitudes of gradients computed for restored-image values, and the gradients are a measure of discontinuities within the restored image. By forcing the norm of $\nabla R$ below some maximum allowed value E, the restored image is forced to be relatively smooth, in turn leading to removal of noise corruption from the noisy image N. A penalty function $\Phi(R)$ that combines the above two constraints and thus serves as a dual-purpose constraint in an optimization procedure for producing a restored image R from an image corrupted both by deterministic degradation and noise is then:

$$\Phi(R) = \|\hat{H} \cdot R - B\|^2 + \lambda \cdot \|\nabla R\|^2$$

where $\lambda$ is a constant that specifies the degree of smoothness required of the restored image R.

While this penalty function $\Phi(R)$ allows optimization methods to be directed towards restored images with significantly decreased noise, with respect to the initial blurred image, the penalty function generally does not sufficiently link deblurring with denoising to steer the optimization methods to a restored image R with desired sharpness and lack of noise. The second term, while effective at removing noise, also generally tends to blur the restored image, since certain sharp discontinuities within an image may be due to sharply defined features, rather than noise. Therefore, better methods that use spatial-domain information to remove noise need to be embodied in a better constraint, or penalty function, to direct the image-restoration process to a restored image with significant noise reduction as well as with adequate levels of deblurring.

The bilateral filter technique, described below, uses spatial-domain information to generate a restored image from an image corrupted with non-deterministic noise. The noisy image N is modeled as:

$$N = I + V$$

where
 I is the original image;
 V is noise; and
 N is the noisy image corresponding to I.

The bilateral filter technique computes a value for position (x,y) of the restored image, Rx,y, as the weighted average of element values in the neighborhood of position (x,y) in the noisy image, as follows:

$$R(x, y) = \sum_{i=x-\frac{M}{2}}^{x+\frac{M}{2}} \sum_{j=y-\frac{N}{2}}^{y+\frac{N}{2}} W_{(x,y,i,j)} N_{(i,j)}$$

where $$W_{(x,y,i,j)} = W_{1(x,y,i,j)} \cdot W_{2(x,y,i,j)};$$

$$W_1 = e^{-\left[\frac{(x-i)^2 + (y-j)^2}{K_1}\right]};$$

$$W_2 = e^{-\left[\frac{(N_{(x,y)} - N_{(i,j)})^2}{K_2}\right]};$$

$K_1$ and $K^2$ are constants; and
 neighborhood is a rectangular $(M+1) \times (N+1)$ region.

The weights $W(x,y,i,j)$ applied to each noisy-image neighborhood value $N(i,j)$ in order to compute the restored-image value Rx,y are each the product of two terms $W_1$ and $W_2$. The term $W_1$ penalizes pixels distant from location (x,y) and favors pixels close to position (x,y). The component $W_2$ penalizes component values, or pixels, that differ markedly from the element value N(x,y). Pixels that differ markedly from N(x,y) often belong to other objects in the image or are a result of noise. The weights are normalized by using constants $K_1$ and $K_2$ equal to, or proportional to, the variance of the terms in the exponents of the above-provided expressions for $W_1$ and $W_2$. Thus, by using a weighted average of the pixels within the neighborhood of each noisy pixel in order to generate each corresponding restored-image pixel, the spatial-domain information can be used to remove noise from a noise-corrupted image.

Figure 16:
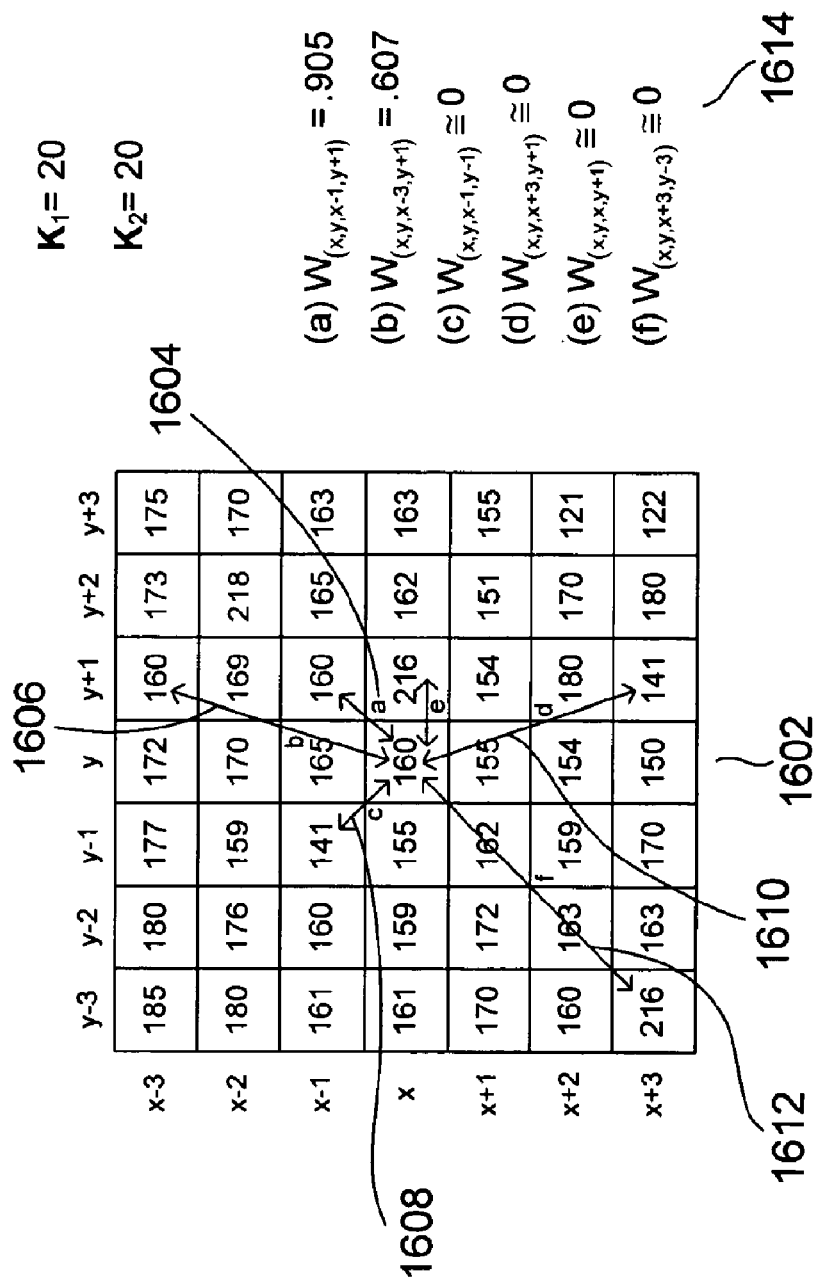
FIG. 16 illustrates computed weights of various pairs of pixel values within the neighborhood of the pixel $N_{x,y}$ of a noisy image N.

FIG. 16 illustrates computed weights of various pairs of pixel values within the neighborhood of the pixel $N_{x,y}$ of a noisy image N. A 7×7 neighborhood 1602 is shown in FIG. 16. Weights for pixel pairs with similar values 1604 and 1606 have substantial magnitudes of 0.905 and 0.606, respectively, with the lower value for the second pair reflecting the greater distance of separation between the two pixels. Weights for pairs of pixels in a neighborhood with greatly different pixel values 1608, 1610, and 1612 are essentially 0. The weights for 6 pairs of pixels, all including pixel (x,y), are shown in a column 1614.

The weights computed in the bilateral filter method are thus powerful spatial-domain information that can be used to filter noise from noise-corrupted images. In method embodiments of the present invention, this powerful spatial-domain information can be incorporated into an optimization constraint to direct an optimization method to a restored image R that is effectively denoised and that is also sharpened and deblurred.

A combined deterministic-blurring and non-deterministic-noise-related penalty function that incorporates both of the above-discussed constraints as well as additional spatial-domain information derived from spatial-domain neighborhood and that is used in method embodiments of the present invention is:

$$\Phi(R, \tilde{R}) = \|\hat{H}R - B\|_2^2 + \lambda_1 \|R - \tilde{R}\|_2^2 + \lambda_2 \sum_{n=1}^{N} (\tilde{R} - D^n \tilde{R}) W(R, n)(\tilde{R} - D^n \tilde{R})$$

where

R = a more sharpened restored image;
$\tilde{R}$ = a more denoised restored image;
$\hat{H}$ = a degradation matrix;
$\lambda_1$ and $\lambda_2$ are constants;
D is a circulant difference matrix:

$$D = \begin{bmatrix} 0 & 0 & \ldots & 0 & 1 \\ 1 & 0 & \ldots & 0 & 0 \\ 0 & 1 & 0 & \ldots & 0 \\ 0 & 0 & \ddots & 0 & \vdots \\ 0 & 0 & 0 & 1 & 0 \end{bmatrix}; \text{ and}$$

W(R,n) is a matrix obtained by applying a weighting function W(•) to each element of R using a neighborhood of size n.

When minimizing $\Phi(R,\tilde{R})$ with respect to $\tilde{R}$, the first term is ignored, and the last two terms result in bilateral-filter denoising.

The optimization problem becomes a problem of finding a pair of restored images R and $\tilde{R}$, where R is a somewhat more sharpened restored image and $\tilde{R}$ is a somewhat more aggressively denoised restored image. The first term in the penalty function $\Phi(R,\tilde{R})$ directs optimization towards a sharpened restored image R that, when the deterministic blurring operation $\hat{H}$ is applied to the sharpened restored image R, produces a deterministic blurred image close to the blurred image B. The final term in the penalty function $\Phi(R,\tilde{R})$ directs the optimization toward a denoised restored image $\tilde{R}$ that has been effectively denoised using spatial-domain information incorporated into weights related to bilateral filter weights, as discussed above. The middle term directs the optimization process toward finding a pair R and $\tilde{R}$ that are close to one another. In other words, the middle term links deblurring to denoising in the overall optimization process, so that R and $\tilde{R}$ tend towards convergence. This middle constraint therefore results in a combination of deterministic deblurring and non-deterministic denoising to produce each of the restored images in the restored-image pair R and $\tilde{R}$. In essence, R and $\tilde{R}$ start at different points and then, through optimization, draw closer together as both R and $\tilde{R}$ are deblurred and denoised, with R moving from a mostly deblurred restored image to both a deblurred and a denoised restored image, and $\tilde{R}$ moving from a mostly denoised restored image to both a deblurred and a denoised restored image as the optimization is conducted under the constraint of the penalty function $\Phi(R,\tilde{R})$. Thus, the optimization process for restoring a corrupted image by method embodiments of the present invention can be expressed as:

find $R,\tilde{R}$ such that $\Phi(R,\tilde{R})$ is minimal:

$$\{R, \tilde{R}\} = \operatorname*{argmin}_{R, \tilde{R}} [\Phi(R, \tilde{R})]$$

Figure 17:
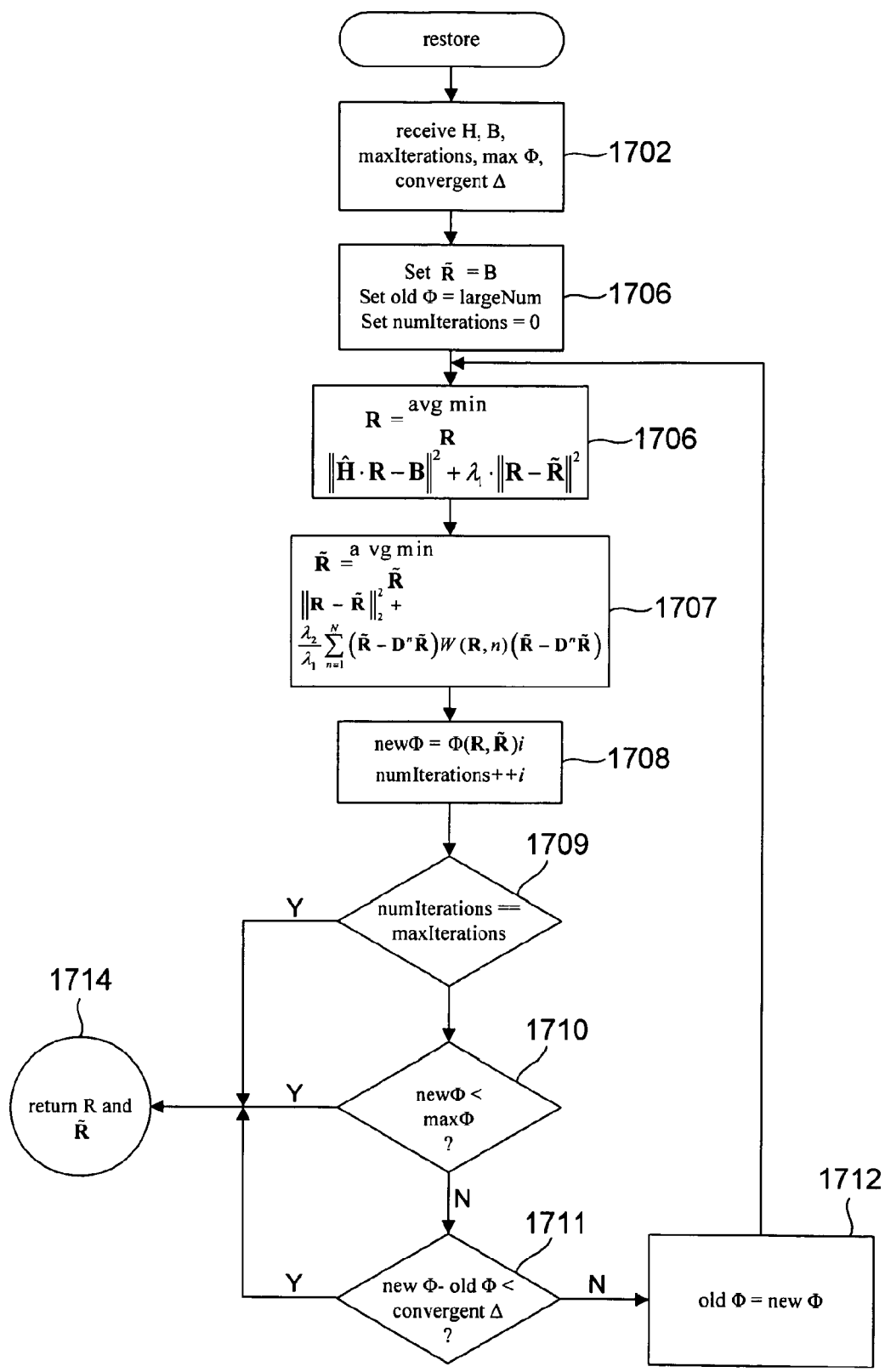
FIG. 17 provides a flow-control diagram for an iterative image-restoration method that represents one embodiment of the present invention.

Unfortunately, this optimization problem is non-convex, and is directed to finding values to two unknowns, namely the restored-image pair R and $\tilde{R}$, rather than a single unknown. One approach to addressing such optimization problems is to employ an iterative scheme in which an approximation to each unknown can be successively obtained in pairs of steps that are iteratively repeated in order to iteratively approach an optimal solution comprising an optimal pair of restored images. FIG. 17 provides a flow-control diagram for an iterative image-restoration method that represents one embodiment of the present invention. The iterative method outlined in the control-flow diagram provided in FIG. 17 represents one family of embodiments of the present invention. In step 1702, a matrix $\hat{H}$ representing a known degradation operation, a corrupted image B, and three parameters maxIterations, max$\Phi$, and convergent $\Delta$. The parameter maxIterations specifies a maximum number of iterations for the restoration procedure. The parameter max$\Phi$ specifies a penalty-function value below which iterative restoration procedure may be halted, and the current restored-image pair R and $\tilde{R}$ returned. The parameter convergent $\Delta$ specifies a value representing a minimum change in the penalty function value during successive iterations, below which the iterative restoration procedure may be halted and the current restored image pair R and $\tilde{R}$ curly returned. In step 1704, $\tilde{R}$ is initially set to the received corrupted image B. In addition, the local variable old$\Phi$ is set to a large number, and the local variable numIterations is set to 0. Then, in the iteration loop comprising step 1706-1712, excessive pairs R and $\tilde{R}$ are computed in each iteration of the loop until a termination condition occurs. In step 1706, a next value for R is determined as a result of an optimization problem.

$$R = \operatorname*{avgmin}_{R} \|\hat{H} \cdot R - B\|^2 + \lambda_1 \cdot \|R - \tilde{R}\|^2$$

In fact, this optimization problem has a closed-form solution of the form:

$$R = (\hat{H} \cdot \hat{H}^T + \lambda_1 \cdot I)^{-1}(\hat{H}^T \cdot B + \lambda_1 \cdot R)$$

where I is the identity matrix.

Thus, in step 1706, the next value of the restored-image R is obtained using a closed-form solution to an optimization problem that employs an optimization constraint comprising the first two terms of the penalty function $\Phi(R,\tilde{R})$. Next, in step 1707, a next value for the restored image $\tilde{R}$ is generated using an optimization method constrained by the penalty function that includes the latter two terms of the above-provided penalty function $\Phi(R,\tilde{R})$:

$$\tilde{R} = \operatorname*{avgmin}_{\tilde{R}} \|R - \tilde{R}\|_2^2 + \frac{\lambda_2}{\lambda_1} \sum_{n=1}^{N} (\tilde{R} - D^n \tilde{R}) W(R, n)(\tilde{R} - D^n \tilde{R})$$

In step 1708, the local variable new$\Phi$ is updated to the value of the penalty function $\Phi(R,\tilde{R})$ based on the values of R and $\tilde{R}$ computed in the current iteration of the iteration loop, and the local variable numIterations is incremented. If the number of iterations completed, stored in local variable numIterations, is equal to the parameter maxIterations, as determined in step 1709, iteration is halted, and the routine "restore" returns the current values of R and $\tilde{R}$, in step 714. Otherwise, if the value new$\Phi$ is less than the parameter max$\Phi$, as determined in step 1710, iteration is halted, and the routine "restore" returns the current values of R and $\tilde{R}$ in step 1714. Otherwise, if the magnitude of the difference between the values of local variables new$\Phi$ and old$\Phi$ is less than the parameter conversion $\Delta$, as determined in step 1711, then iteration is halted, and the routine "restore" returns the current values of R and $\tilde{R}$, in step 714. Otherwise, the local variable old$\Phi$ is set to the value of local variable new$\Phi$, in step 1712, and control flows back to 1706 beginning a next iteration of the iteration loop comprising steps 1706-1712.

At repeated iterations of the iteration loop comprising step 1706-1712, better and better values for the restored-image pair R and $\tilde{R}$ are generated until a termination condition accrues. R and $\tilde{R}$ should both be reasonably high-quality restored images, with R somewhat sharper than R and $\tilde{R}$ generally smoother than R. Eventually, once the routine "restore" returns the pair $\{R,\tilde{R}\}$, a user may decide which image of the restored-image pair $\{R,\tilde{R}\}$ is preferable, in certain embodiments of the present invention. In alternative embodiments of the present invention, one or more metrics can be computed for R and $\tilde{R}$ to automatically decide which of the restored-image pair to select as the final restored image.

As discussed above, one-dimensional-image-restoration methods of the present invention are straightforwardly extended to two-dimensional images. For example, in the above-described iterative optimization or minimization, the deblurring step can be carried on a two-dimensional image out row-by-row, or a two-dimensional image can be transformed into a one-dimensional image, with the transfer matrix accordingly transformed, in order to carry out deblurring by the above-described optimization method. The denoising step is easily carried out on two-dimensional images, since the bilateral filter method was originally devised to denoise two-dimensional images.

As discussed above, method embodiments of the present invention may be incorporated into any number of different systems that generate restored images from corrupted images. Systems may include image-acquisition devices, including digital cameras and cell phones that incorporate digital cameras, image-acquisition instruments included in reconnaissance aircraft, spacecraft, and other such vehicles, and a plethora of additional types of image-acquisition devices and systems. Method embodiments of the present invention can be additionally incorporated into image-processing systems and system software executed on personal computers, workstations, and larger computer systems, including distributed computer systems. Again, it should be emphasized that the method embodiments of the present invention are processes which essentially compute and select restored images among an enormous state space of possible restored images. These processes generate useful, concrete, and tangible restored-image results that are stored, via physical transformations, in various types of electronic media, computer-readable media, and human-readable media. Again, while many steps of the process are characterized in the above disclosure using mathematical expressions, it is well known to those even cursorily familiar with computer science and image processing that these mathematical expressions are equivalent to computational routines.

Although the present invention has been described in terms of particular embodiments, it is not intended that the invention be limited to these embodiments. Modifications within the spirit of the invention will be apparent to those skilled in the art. For example, method embodiments of the present invention may be implemented in many different ways, depending on selection of various computational parameters, including modular organization, control structures, data structures, programming languages, and program-execution environments, including operating-system platforms. While an iterative restored-image-pair generation iteration loop is described, above, in the control-flow diagram provided in FIG. 17, additional strategies for solving the optimization problem constrained by the penalty function $\Phi(R,\tilde{R})$ are possible, and fall within the scope of the current claims. While the denoising scheme is derived from the well-known bilateral filter, a variety of different possible denoising techniques can be used, including use of different terms, products, and expressions for weighting neighborhood values, using different sizes and shapes for neighborhoods, using different constant values, and many additional such variations. As discussed above, there are many different possible norms that can be computed for matrices and vectors, many of these different types of norms suitable for computing terms of the penalty function $\Phi(R,\tilde{R})$. The constants $\lambda_1$ and $\lambda_2$ in the penalty function $\Phi(R,\tilde{R})$ may be differently selected in order to achieve different balances of denoising and deblurring, and may have different optimal values for different types of blurred images. The method embodiments of the present invention rely on characterization of non-deterministic image-corruption processes embodied in a matrix operator $\hat{H}$, but, in alternative embodiments, image-corruption operator $\hat{H}$ may additionally be a variable that is optimized during optimization, including additional constraints on $\hat{H}$. In alternative embodiments of the present invention, additional terms may be employed in the penalty function $\Phi(R,\tilde{R})$. As discussed above, certain embodiments of the present invention may be incorporated into a wide variety of different system embodiments of the present invention, including image-acquisition devices and systems as well as image-processing and image-display systems.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for restoring a blurred and noise-corrupted image, the method comprising:
receiving the blurred and corrupted image B and a spatial-domain blur-operator matrix H that describes deterministic corruption in the blurred and corrupted image;
extending the blur-operator matrix H to produce a degradation matrix $\hat{H}$ by adding rows that specify particular restored-image values obtained from smooth regions of the blurred and corrupted image B;

iteratively deblurring and denoising the blurred and corrupted image B to produce a restored-image pair R and R̃; and storing the restored-image pair R and R̃ in a computer-readable memory for subsequent output to a user or for transmission to a restored-image-pair receiving device.

2. The method of claim 1 wherein extending the blur-operator matrix H by adding rows that specify particular restored-image values obtained from smooth regions of the blurred and corrupted image B further comprises:

identifying neighborhoods in the blurred and corrupted image B with least pixel-value variation; and while the blur-operator matrix H has fewer rows than columns, selecting a next pixel value from a next identified neighborhood of blurred and corrupted image B, inserting a corresponding row in the blur-operator matrix H to extend blur-operator matrix H by one row, and removing the inserted row from the extended blur-operator matrix H when the determinant of the extended blur-operator matrix H is 0.

3. The method of claim 1 wherein iteratively deblurring and denoising the blurred and corrupted image B to produce a restored-image pair R and R̃ further comprises:

setting a first restored image R̃ equal to B; and iteratively generating next current values of a second restored image R and the first restored image R̃ under a constraint that directs R towards a deblurred restored image of B, that directs the first restored image R̃ towards a denoised restored image of B, and that minimizes a difference between the second restored image R and the first restored image R̃.

4. A method of claim 3 wherein iteratively generating next current values of a second restored image R and the first restored image R̃ under a constraint that directs R towards a deblurred restored image of B, that directs the first restored image R̃ towards a denoised restored image of B, and that minimizes a difference between the second restored image R and the first restored image R̃ further comprises:

for a number of iterations prior to occurrence of an iteration termination condition, determining a next current value of the second restored image R by optimization of the second restored image R under a constraint that a difference between the second restored image R blurred by the blur operator H and the blurred and corrupted image B be minimized and a difference between the second restored image R and the current value of the first restored image R̃ be minimized;

determining a next current value for the first restored image R̃ under a constraint that a difference between the current value of the second restored image R and the first restored image R̃ be minimized and that a weighted differential of the first restored image R̃ be minimized; and determining whether or not an iteration termination condition has occurred.

5. The method of claim 4 wherein determining a next value of the second restored image R by optimization of the second restored image R under a constraint that a difference between the second restored image R blurred by the blur operator H and the blurred and corrupted image B be minimized and a difference between the second restored image R and the current value of the first restored image R̃ be minimized further comprises generating a next value for the second restored image R under a constraint as expressed by:

$$R = \underset{R}{\text{avgmin}} \, \|\hat{H} \cdot R - B\|^2 + \lambda_1 \cdot \|R - \tilde{R}\|^2$$

wherein $\lambda_1$ is a constant.

6. The method of claim 4 wherein determining a next value of the second restored image R by optimization of the second restored image R under a constraint that a difference between R blurred by the blur operator H and the blurred and corrupted image B be minimized and a difference between the second restored image R and the current value of the first restored image R̃ be minimized further comprises determining the second restored image R by:

$$R = (\hat{H} \cdot \hat{H}^T + \lambda_1 \cdot I)^{-1} (\hat{H}^T \cdot B + \lambda_1 \cdot \tilde{R})$$

wherein I is the identity matrix and $\lambda_1$ is a constant.

7. The method of claim 4 wherein determining a next current value for the first restored image R̃ under a constraint that a difference between the current value of the second restored image R and the first restored image R̃ be minimized and that a weighted differential of R̃ be minimized further comprises generating a next current value for the first restored image R̃ under a constraint as expressed by:

$$\tilde{R} = \underset{\tilde{R}}{\text{avgmin}} \, \|R - \tilde{R}\|_2^2 + \frac{\lambda_2}{\lambda_1} \sum_{n=1}^{N} (\tilde{R} - D^n \tilde{R}) W(R, n)(\tilde{R} - D^n \tilde{R})$$

wherein

R is the more sharpened restored image;
R̃ is the more denoised restored image;
$\lambda_1$ and $\lambda_2$ are constants;
D is a circulant difference matrix:

$$D = \begin{bmatrix} 0 & 0 & \ldots & 0 & 1 \\ 1 & 0 & \ldots & 0 & 0 \\ 0 & 1 & 0 & \ldots & 0 \\ 0 & 0 & \ddots & 0 & \vdots \\ 0 & 0 & 0 & 1 & 0 \end{bmatrix}; \text{ and}$$

W(R,n) is a matrix obtained by applying a weighting function W(•) to each element of R using a neighborhood of size n.

8. The method of claim 4 further including generating a next value of a penalty function Φ(R,R̃) following generation of a next current value of the second restored image R and a next current value of the first restored image R̃, wherein $$\Phi(R, \tilde{R}) = \|\hat{H}R - B\|_2^2 + \lambda_1 \|R - \tilde{R}\|_2^2 + \lambda_2 \sum_{n=1}^{N} (\tilde{R} - D^n \tilde{R}) W(R, n)(\tilde{R} - D^n \tilde{R}).$$

9. The method of claim 4 wherein termination conditions include one or more of:

a number of iterations of computing next current values of the second restored image R and the first restored image R̃ exceeding a threshold number of iterations;

a difference between a last generated value of the penalty function Φ(R,R̃) and a next most recently generated value of penalty function Φ(R,R̃) falling below a threshold value;

and the last generated value of the penalty function Φ(R,R̃) falling below a threshold value.

10. The method of claim 1 wherein the blurred and corrupted image B and the restored-image pair R and R̃ each comprises one of:
an array of scalar values representing spatial intensities;
an array of scalar, composite values representing spatial intensity and color;
an array of scalar values representing spatial components of color;
a matrix of scalar values representing spatial intensities;
a matrix of scalar, composite values representing spatial intensity and color; and
a matrix of scalar values representing spatial components of color.

11. A system that restores a blurred and noise-corrupted image, the system comprising:
an electronic memory and mass-storage memory;
a processor that accesses the electronic memory and mass-storage memory; and
one or more executable routines that execute on the processor to restore the blurred and noise-corrupted image by
receiving the blurred and corrupted image B and a spatial-domain blur-operator matrix H that describes deterministic corruption in the blurred and corrupted image;
extending the blur-operator matrix H to produce a degradation matrix Ĥ by adding rows that specify particular restored-image values obtained from smooth regions of the blurred and corrupted image B;
iteratively deblurring and denoising the blurred and corrupted image B to produce a restored-image pair R and R̃; and
storing the restored-image pair R and R̃ in a computer-readable memory for subsequent output to a user or for transmission to a restored-image-pair receiving device.

12. The system of claim 11 wherein extending the blur-operator matrix H by adding rows that specify particular restored-image values obtained from smooth regions of the blurred and corrupted image B further comprises:
identifying neighborhoods in the blurred and corrupted image B with least pixel-value variation; and
while the blur-operator matrix H has fewer rows than columns,
selecting a next pixel value from a next identified neighborhood of blurred and corrupted image B,
inserting a corresponding row in the blur-operator matrix H to extend blur-operator matrix H by one row, and
removing the inserted row from the extended blur-operator matrix H when the determinant of the extended blur-operator matrix H is 0.

13. The system of claim 11 wherein iteratively deblurring and denoising the blurred and corrupted image B to produce a restored-image pair R and R̃ further comprises:
setting a first restored image R̃ equal to B; and
iteratively generating next current values of a second restored image R and the first restored image R̃ under a constraint that directs R towards a deblurred restored image of B, that directs the first restored image R̃ towards a denoised restored image of B, and that minimizes a difference between the second restored image R and the first restored image R̃.

14. A system of claim 13 wherein iteratively generating next current values of a second restored image R and the first restored image R̃ under a constraint that directs R towards a deblurred restored image of B, that directs the first restored image R̃ towards a denoised restored image of B, and that minimizes a difference between the second restored image R and the first restored image R̃ further comprises:
for a number of iterations prior to occurrence of an iteration termination condition,
determining a next current value of the second restored image R by optimization of the second restored image R under a constraint that a difference between the second restored image R blurred by the blur operator H and the blurred and corrupted image B be minimized and a difference between the second restored image R and the current value of the first restored image R̃ be minimized;
determining a next current value for the first restored image R̃ under a constraint that a difference between the current value of the second restored image R and the first restored image R̃ be minimized and that a weighted differential of the first restored image R̃ be minimized; and
determining whether or not an iteration termination condition has occurred.

15. The system of claim 14 wherein determining a next value of the second restored image R by optimization of the second restored image R under a constraint that a difference between the second restored image R blurred by the blur operator H and the blurred and corrupted image B be minimized and a difference between the second restored image R and the current value of the first restored image R̃ be minimized further comprises generating a next current value for the second restored image R under a constraint as expressed by:

$$R = \underset{R}{\text{avgmin}} \, \|\hat{H} \cdot R - B\|^2 + \lambda_1 \cdot \|R - \tilde{R}\|^2$$

wherein $\lambda_1$ is a constant.

16. The system of claim 14 wherein determining a next value of the second restored image R by optimization of the second restored image R under a constraint that a difference between R blurred by the blur operator H and the blurred and corrupted image B be minimized and a difference between the second restored image R and the current value of the first restored image R̃ be minimized further comprises determining the second restored image R by:

$$R = (\hat{H} \cdot \hat{H}^T + \lambda_1 \cdot I)^{-1}(\hat{H}^T \cdot B + \lambda_1 \cdot R)$$

wherein I is the identity matrix and $\lambda_1$ is a constant.

17. The system of claim 14 wherein determining a next current value for the first restored image R̃ under a constraint that a difference between the current value of the second restored image R and the first restored image R̃ be minimized and that a weighted differential of R̃ be minimized further comprises generating a next current value for the first restored image R̃ under a constraint as expressed by:

$$\tilde{R} = \underset{\tilde{R}}{\text{avgmin}} \, \|R - \tilde{R}\|_2^2 + \frac{\lambda_2}{\lambda_1} \sum_{n=1}^{N} (\tilde{R} - D^n \tilde{R}) W(R, n)(\tilde{R} - D^n \tilde{R})$$

wherein
R is the more sharpened restored image;
R̃ is the more denoised restored image;
$\lambda_1$ and $\lambda_2$ are constants;

D is a circulant difference matrix:

$$D = \begin{bmatrix} 0 & 0 & \cdots & 0 & 1 \\ 1 & 0 & \cdots & 0 & 0 \\ 0 & 1 & 0 & \cdots & 0 \\ 0 & 0 & \ddots & 0 & \vdots \\ 0 & 0 & 0 & 1 & 0 \end{bmatrix}; \text{ and}$$

W(R,n) is a matrix obtained by applying a weighting function W(•) to each element of R using a neighborhood of size n.

18. The system of claim 14 further including generating a next value of a penalty function $\Phi(R,\tilde{R})$ following generation of a next current value of the second restored image R and a next current value of the first restored image $\tilde{R}$, wherein $$\Phi(R, \tilde{R}) = \left\| \hat{H}R - B \right\|_2^2 + \lambda_1 \left\| R - \tilde{R} \right\|_2^2 + \lambda_2 \sum_{n=1}^{N} (\tilde{R} - D^n \tilde{R}) W(R, n)(\tilde{R} - D^n \tilde{R}).$$

19. The system of claim 14 wherein termination conditions include one or more of:
 a number of iterations of computing next current values of the second restored image R and the first restored image $\tilde{R}$ exceeding a threshold number of iterations;
 a difference between a last generated value of the penalty function $\Phi(R,\tilde{R})$ and a next most recently generated value of penalty function $\Phi(R,\tilde{R})$ falling below a threshold value;
 and the last generated value of the penalty function $\Phi(R,\tilde{R})$ falling below a threshold value.

20. The system of claim 11 wherein the blurred and corrupted image B and the restored-image pair R and $\tilde{R}$ each comprises one of:
 an array of scalar values representing spatial intensities;
 an array of scalar, composite values representing spatial intensity and color;
 an array of scalar values representing spatial components of color;
 a matrix of scalar values representing spatial intensities;
 a matrix of scalar, composite values representing spatial intensity and color; and
 a matrix of scalar values representing spatial components of color.

* * * * *